(12) United States Patent
Broggi

(10) Patent No.: US 11,970,156 B1
(45) Date of Patent: *Apr. 30, 2024

(54) PARKING ASSISTANCE USING A STEREO CAMERA AND AN ADDED LIGHT SOURCE

(71) Applicant: Ambarella International LP, Santa Clara, CA (US)

(72) Inventor: Alberto Broggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/362,247

(22) Filed: Jun. 29, 2021

Related U.S. Application Data

(63) Continuation of application No. 16/892,465, filed on Jun. 4, 2020, now Pat. No. 11,117,570.

(51) Int. Cl.
*B60W 30/06* (2006.01)
*G06V 20/56* (2022.01)
*G06V 20/58* (2022.01)

(52) U.S. Cl.
CPC ........... *B60W 30/06* (2013.01); *G06V 20/586* (2022.01); *G06V 20/588* (2022.01);
(Continued)

(58) Field of Classification Search
CPC ........... G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; B60W 30/06; B60W 2420/42; B60R 2001/1215; B60R 1/00; B60R 2025/1013; B60R 2025/1016;
(Continued)

(56) References Cited

U.S. PATENT DOCUMENTS 9,641,807 B2 * 5/2017 Schuder .................. H04N 7/18
2011/0267430 A1 * 11/2011 Sakano ..................... G06T 7/73
348/46

(Continued)

*Primary Examiner* — Nathnael Aynalem
(74) *Attorney, Agent, or Firm* — Maiorana Patent Law, PA

(57) ABSTRACT

An apparatus including a capture device, an illumination device and a processor. The capture device may be configured to generate pixel data corresponding to an exterior view from a vehicle. The illumination device may be configured to generate light for the exterior view. The processor may be configured to generate video frames from the pixel data, perform computer vision operations on the video frames to detect objects in the video frames and generate a control signal. The objects detected may provide data for a vehicle maneuver. The control signal may adjust characteristics of the light generated by the illumination device. The characteristics of the light may be adjusted in response to the objects detected by the processor. The light from the illumination device may facilitate detection of the objects by the processor.

20 Claims, 16 Drawing Sheets

(52) U.S. Cl.
CPC ... *B60R 2300/107* (2013.01); *B60R 2300/806* (2013.01); *B60W 2420/42* (2013.01)

(58) Field of Classification Search
CPC ........ B60R 2300/105; B60R 2300/106; B60R 2300/806; B60R 2300/8066; B60R 2300/8073; B60R 2300/8086; B60R 2300/8093; B60R 2300/107; G01S 17/93; G01S 17/931; B62D 15/029; G06V 20/586; G06V 20/588
USPC ........................................................ 348/148
See application file for complete search history.

(56) References Cited

U.S. PATENT DOCUMENTS

| | | | |
|---|---|---|---|
| 2013/0033604 A1* | 2/2013 | Ohshima | B60R 11/04 348/148 |
| 2013/0182902 A1* | 7/2013 | Holz | G06T 7/292 382/103 |
| 2016/0321502 A1* | 11/2016 | Kamath | G06Q 30/00 |
| 2017/0083774 A1* | 3/2017 | Solar | G06V 20/588 |
| 2018/0029641 A1* | 2/2018 | Solar | G01S 17/931 |
| 2019/0077372 A1* | 3/2019 | Greenberg | B60K 35/00 |

\* cited by examiner

PARKING ASSISTANCE USING A STEREO CAMERA AND AN ADDED LIGHT SOURCE

This application relates to U.S. application Ser. No. 16/892,465, filed on Jun. 4, 2020, which is hereby incorporated by reference in its entirety.

FIELD OF THE INVENTION

The invention relates to autonomous driving generally and, more particularly, to a method and/or apparatus for parking assistance using a stereo camera and an added light source.

BACKGROUND

Vehicles are capable of increasing amounts of autonomy. Even while human drivers are still primarily controlling a vehicle, autonomous control of the vehicle can be used to aid the driver. Autonomous control of the vehicle can provide various forms of driver assistance, such as lane keeping assist and automatic parking. Vehicle autonomy is particularly useful in scenarios such as parking because the frame of the vehicle obstructs the view of the driver. Technology can provide additional data compared to what can be seen by the driver to park safely.

As an aid to the parking maneuver, conventional vehicles use sonar systems. Sonar systems are able to detect obstacles in close proximity to the vehicle. Sonar systems usually provide assistance with an alert to the driver with sound or, in some cases, also by showing images to the driver. Sonars are effective because the sonar system can make detections that are not always visible to the driver. However, sonar systems are not precise. The lack of precision limits the driver assistance capabilities of sonar systems. For example, sonar systems might not be helpful when parking in a tight spot. A sonar system might have difficulty detecting very thin objects.

Using cameras to detect objects can further enhance autonomous driving capabilities. Similar to sonar systems, cameras can provide a view that does not suffer from the obstructions that the driver has. Combined with computer vision, cameras can be used to detect objects with greater detail than sonar systems. However, the detection using computer vision is limited in low light environments. When there is limited illumination (or the scene has no illumination) objects might not be detected. When the scene is too dark, cameras using visible spectrum light have limited effectiveness. Infrared light can be used. However, infrared light can result in artifacts in captured images.

It would be desirable to implement parking assistance using a stereo camera and an added light source.

SUMMARY

The invention concerns an apparatus comprising a capture device, an illumination device and a processor. The capture device may be configured to generate pixel data corresponding to an exterior view from a vehicle. The illumination device may be configured to generate light for the exterior view. The processor may be configured to generate video frames from the pixel data, perform computer vision operations on the video frames to detect objects in the video frames and generate a control signal. The objects detected may provide data for a vehicle maneuver. The control signal may adjust characteristics of the light generated by the illumination device. The characteristics of the light may be adjusted in response to the objects detected by the processor. The light from the illumination device may facilitate detection of the objects by the processor.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
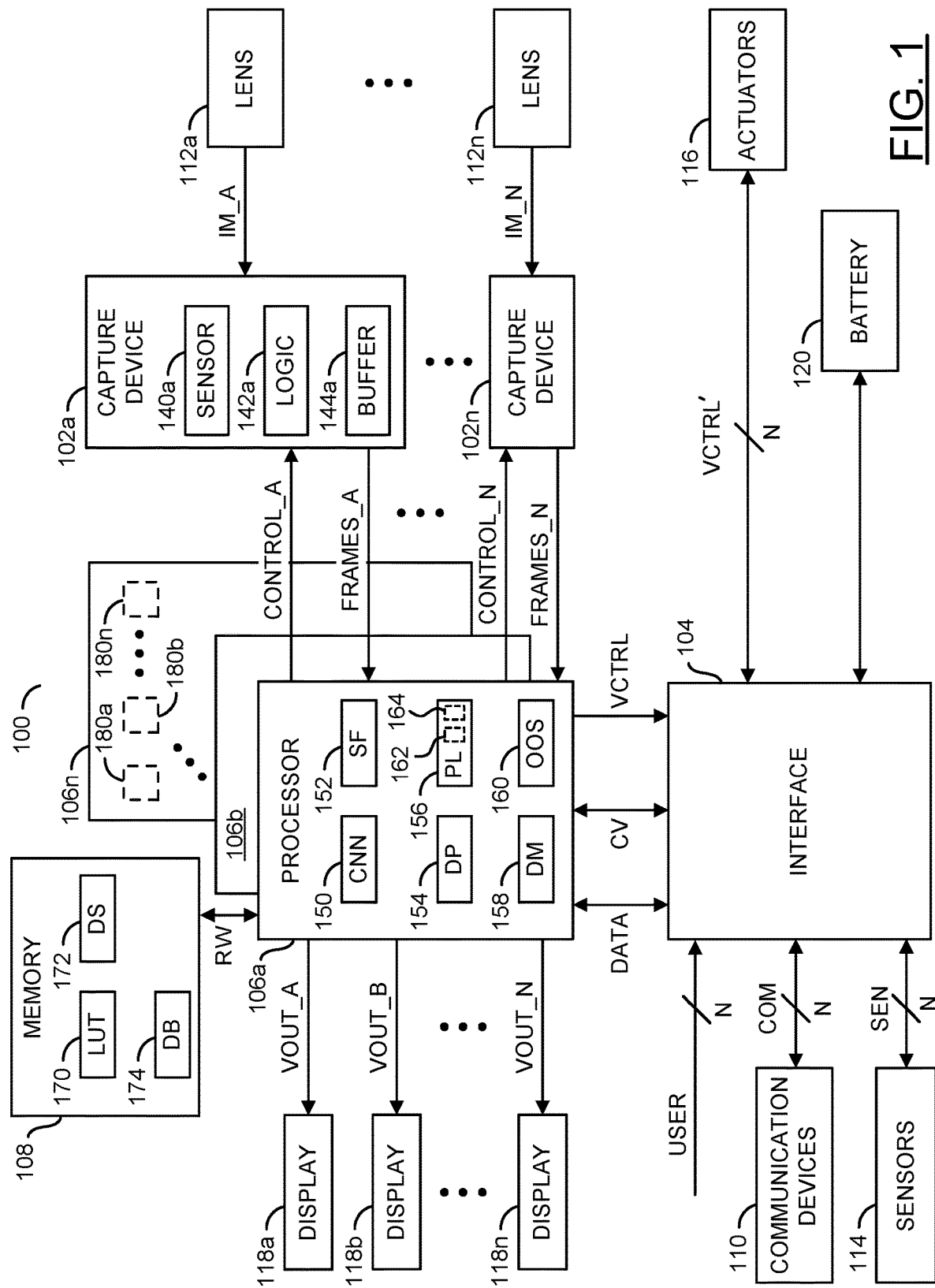
FIG. 1 is a diagram illustrating an embodiment of the present invention.

Embodiments of the present invention include providing parking assistance using a stereo camera and an added light source that may (i) ensure sufficient illumination for computer vision, (ii) enable computer vision operations to be performed in both light and dark environments, (iii) provide a light source beneath the external side-view mirrors, (iv) provide a light source that is directed away from the eyes of people, (v) provide a source of light from above a stereo camera pair, (vi) provide illumination around the sides of a vehicle, (vii) provides a texture to assist with stereo vision processing, (viii) adjust the illumination in response to objects detected and/or (ix) be implemented as one or more integrated circuits.

Embodiments of the present invention may be configured to implement computer vision to enable autonomous driving features of a vehicle. In order to provide effective computer vision, an illumination device may be implemented to provide a well-lit scene for the cameras to capture images. The images may be analyzed using computer vision processing. The illumination provided may enable improved accuracy of computer vision results in poorly lit environments (e.g., facilitate detection of objects).

Embodiments of the present invention may be configured to add a source of light in a position that may not cause problems to other vehicles (e.g., complies with road and/or vehicle regulations). The source of light may provide sufficient illumination to enable cameras to capture well-lit images to facilitate locating objects and/or obstacles using computer vision. The light source may be configured to provide illumination and/or vary an intensity and/or color of the light generated. Adjusting an intensity and/or color of the light generated may be used to help the automatic detection of objects by computer vision and help other people notice the vehicle. For example, if a vehicle is driving autonomously, people might not notice that the vehicle is going to start moving if a driver is not behind the wheel. The lighting provided may be used as an indication that the ego vehicle may start moving. In an example, the illumination may be dim when no objects are detected, the intensity and/or color may be adjusted when an object is detected, a specific color may be selected to indicate that a pedestrian has been detected, etc.

Embodiments of the present invention may comprise a number of short range cameras. The cameras may be configured to capture images to enable object detection. The objects detected may be identified as obstacles in the close proximity of the ego vehicle (e.g., objects between 0 and 5 meters around the car). Cameras located at the front of the ego vehicle may utilize light generated from front headlamps as illumination for the field of view. Similarly, cameras located at the rear of the ego vehicle may use the back lamp (e.g., when moving in reverse) as illumination for the field of view. Since vehicles do not have illumination to the sides, the illumination devices of the present invention may provide light for the fields of view of side-mounted cameras. The light provided by the illumination device may provide illumination to ensure accurate object detection in conditions of bad illumination (e.g., at night, in a non-lit parking garage, underground situations, etc.).

Embodiments of the present invention may be configured to implement an illumination device beneath each of the external side-view mirrors. The illumination devices may be implemented to emit light downwards. Directing the light source downwards may ensure that people do not get blinded by the strong light while still illuminating the area around the side of the ego vehicle from a position higher than the location of the cameras.

Embodiments of the present invention may implement stereo cameras. Results from stereo processing may be improved when an environment captured has some texture. The illumination device may be configured to project some texture to assist with stereo vision processing and/or object detection. The illumination device may project visible light with a random texture. The color and/or texture (or additionally graphics) may be implemented along with the illumination to aid in stereo vision processing, computer vision analysis, and/or for helping people understand what the vehicle has detected and how the vehicle may be interpreting the scene. The color and/or intensity of the illumination may further be used to indicate the intentions of the ego vehicle. For example, if the ego vehicle is moving autonomously (e.g., without a driver behind the wheel), the illumination may be used to indicate to the people nearby that the vehicle may be about to exit from a parking spot by just switching on the lateral lights as an additional indicator.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras (e.g., a stereo camera). The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
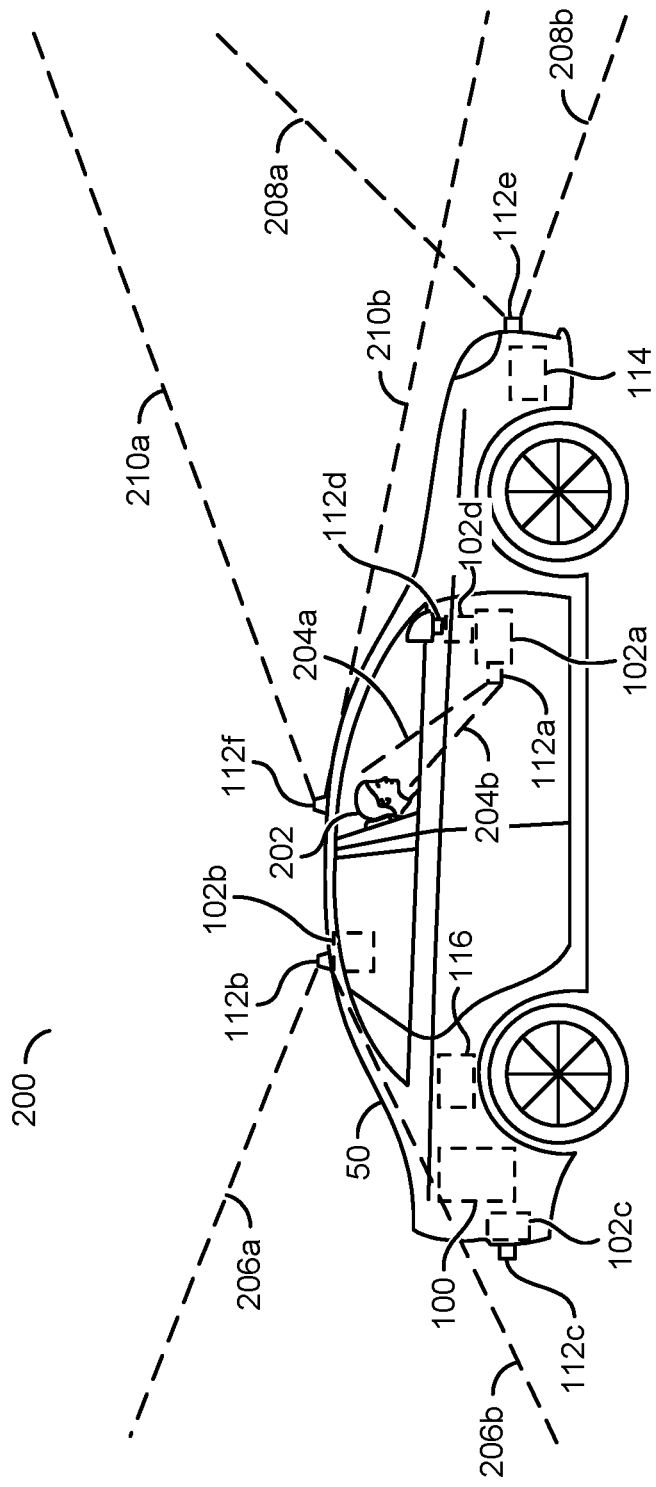
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment).

The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data. The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
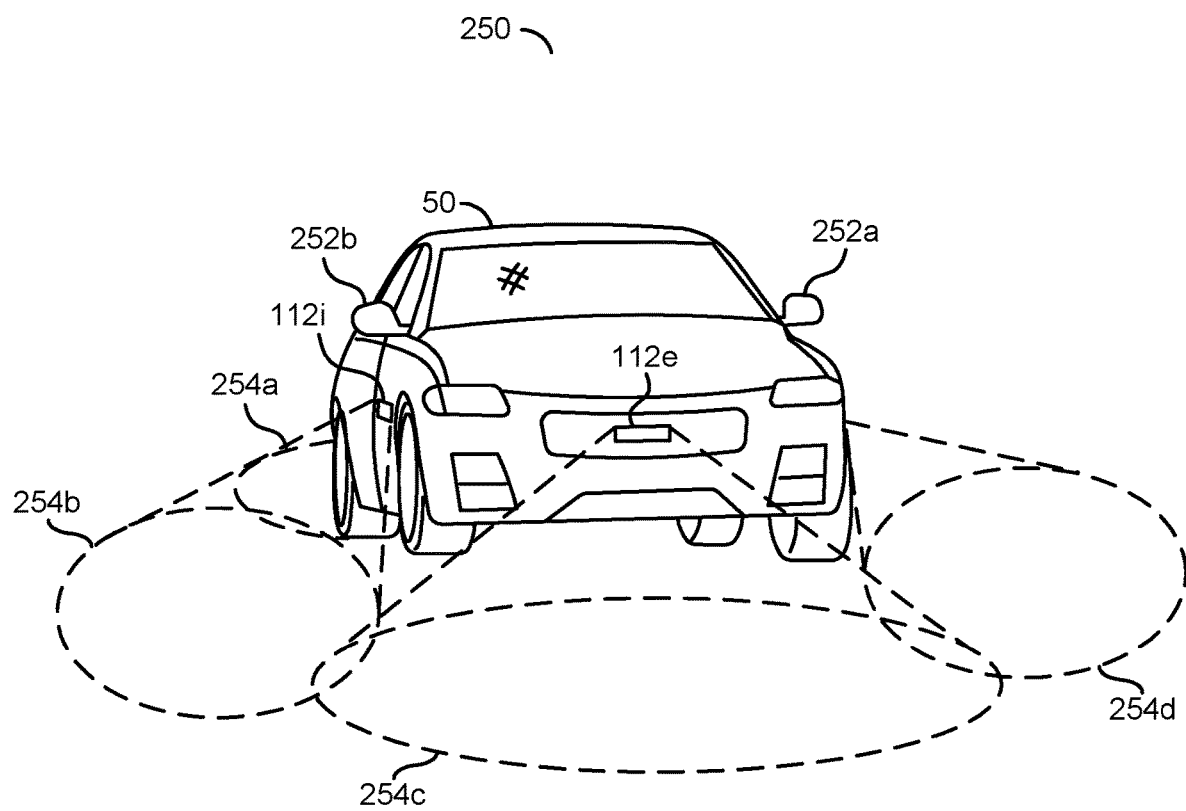
FIG. 3 is a diagram illustrating a vehicle camera system capturing an all-around view.

Referring to FIG. 3, a diagram illustrating the vehicle camera system 100 capturing an all-around view is shown. An external view 250 of the ego vehicle 50 is shown. External side view mirrors 252a-252b are shown. The side view mirror 252a may be a side view mirror on the driver side of the ego vehicle 50. The side view mirror 252b may be a side view mirror on the passenger side of the ego vehicle 50. The camera lens 112e is shown on the front grille of the ego vehicle 50. The camera lens 112i is shown on a passenger side of the ego vehicle 50. The camera lens 112i is shown below the passenger side view mirror 252b. Similarly, one of the lenses 112a-112n may be implemented at a level below the driver side view mirror 252a (not visible from the perspective of the external view 250 shown).

An all-around view 254a-254d is shown. In an example, the all-around view 254a-254d may enable an all-around view (AVM) system. The AVM system may comprise four cameras (e.g., each camera may comprise a combination of one of the lenses 112a-112n (or a stereo pair of the lenses 112a-112n) and one of the capture devices 102a-102n). In the perspective shown in the external view 250, the lens 112e and the lens 112i may each be one of the four cameras and the other two cameras may not be visible. In an example, the lens 112e may be a camera located on the front grille of the ego vehicle 50, one of the cameras may be on the rear (e.g., over the license plate), the lens 112i may be located below the side view mirror 252b on the passenger side and one of the cameras may be located below the side view mirror 252a on the driver side. The arrangement of the cameras may be varied according to the design criteria of a particular implementation.

Each camera providing the all-around view 254a-254d may implement a fisheye lens (e.g., the lens 112e and the lens 112i shown may be fisheye lenses) and may capture a video frame with a 180 degrees angular aperture. The all-around view 254a-254d is shown providing a field of view coverage all around the ego vehicle 50. For example, the portion of the all-around view 252a may provide coverage for a rear of the ego vehicle 50, the portion of the all-around view 252b may provide coverage for a passenger side of the ego vehicle 50, the portion of the all-around view 252c may provide coverage for a front of the ego vehicle 50 and the portion of the all-around view 252d may provide coverage for a driver side of the ego vehicle 50. Each portion of the all-around view 252a-252d may be one field of view of a camera mounted to the ego vehicle 50. Each portion of the all-around view 254a-254d may be dewarped and stitched together by the processors 106a-106n to provide an enhanced video frame that represents a top-down view near the ego vehicle 50. The processors 106a-106n may modify the top-down view based on the all-around view 254a-254d to provide a representation of a bird's-eye view of the ego vehicle 50.

The all-around view 254a-254d may be captured by four of the capture devices (e.g., 102a-102d) implemented by camera system 100. In some embodiments, the capture devices 102a-102d may be connected to an on-board processing system (e.g., a PC, a FPGA, a DSP, an ASIC, etc.). For example, the capture devices 102a-102d may be connected to the processors 106a-106n. The video processing pipeline 156 may receive the captured video frames (e.g., images) and process the video frames to create a bird's-eye view. The processors 106a-106n may be further configured to detect special patterns (e.g., QR codes and/or textured light patterns). The processors 106a-106n may be further configured to detect image features for object detection using the computer vision operations.

In some embodiments, the all-around view 254a-254d may be presented to the driver 202 on one or more of the displays 118a-118n in real-time. The all-around view 254a-254d may assist the driver 202 by providing a representation of the position of the ego vehicle 50 with respect to nearby obstacles that may be difficult to see because of the body of the ego vehicle 50 may obstruct the view of the driver 202. When the driver 202 is performing a maneuver near an obstacle, the all-around view 254a-254d may be one useful perspective.

In some embodiments, the all-around view 254a-254d may be used by the processors 106a-106n to detect objects and/or determine a location of objects with respect to the ego vehicle 50 using computer vision operations. The results of the computer vision operations may enable the processors 106a-106n to understand the surroundings of the ego vehicle 50. The results of the computer vision operations may be used to enable autonomous driving of the ego vehicle 50. In one example, the processors 106a-106n may be configured to provide controls to various systems of the ego vehicle 50 (e.g., a drive train, a steering system, a braking system, etc.). In another example, the processors 106a-106n may be configured to provide the results of the computer vision operations to a system of the ego vehicle 50 that provides autonomous controls to the ego vehicle 50. The implementation of the autonomous control of the ego vehicle 50 may be varied according to the design criteria of a particular implementation.

The results of the computer vision operations performed using the video frames generated in response to the all-around view 254a-254d may be used to provide data for autonomous control of the ego vehicle 50. The autonomous control of the ego vehicle 50 may be configured to perform a vehicle maneuver. In one example, the vehicle maneuver may comprise backing into and/or pulling out of a parking spot. In another example, the vehicle maneuver may comprise performing parallel parking. In yet another example, the vehicle maneuver may comprise changing a lane in traffic. In still another example, the vehicle maneuver may comprise full autonomous control of the ego vehicle 50. In order to acquire the data about the objects near the ego vehicle 50, the all-around view 254a-254d may need to provide sufficient detail for object detection. For autonomous control of the ego vehicle 50, the camera system 100 may be configured to operate in various conditions (e.g., light, dark, rain, snow, sunny, etc.). The apparatus 100 may be configured to provide illumination to facilitate the detection of objects within the all-around view 254a-254d.

Figure 4:
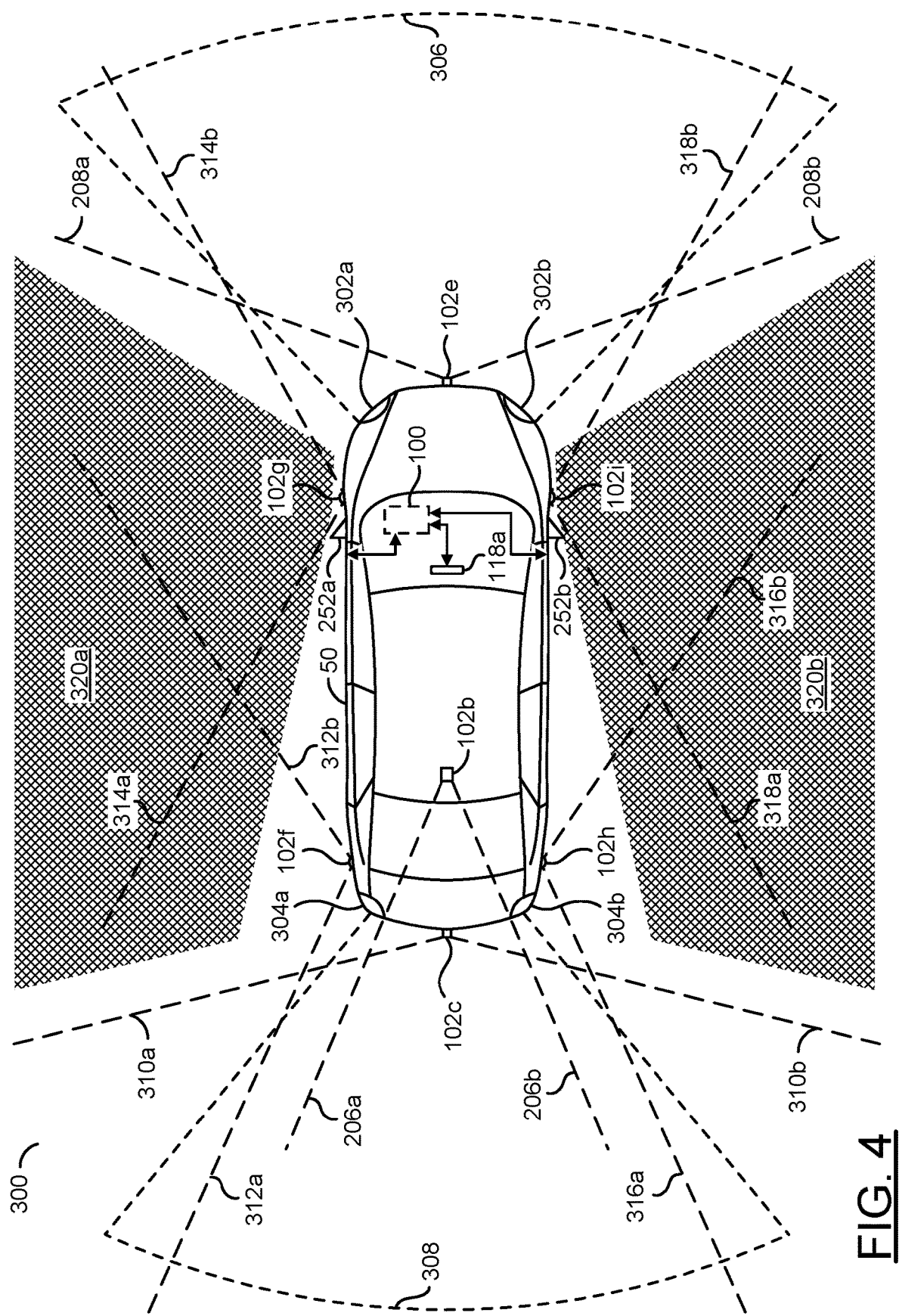
FIG. 4 is a diagram illustrating an exterior view from a vehicle and areas of illumination around a vehicle.

Referring to FIG. 4, a diagram illustrating an exterior view from a vehicle and areas of illumination around a vehicle is shown. An overhead view 300 of the ego vehicle 50 is shown. The apparatus 100 is shown within the ego vehicle 50. A subset of the capture devices 102a-102n are shown on the ego vehicle 50. The display 118a is shown within the ego vehicle 50. While only one of the displays 118a is shown as a representative example, generally the ego vehicle 50 may comprise more than one of the displays 118a-118n.

Front headlights 302a-302b are shown on a front end of the ego vehicle 50. Rear taillights 304a-304b are shown on a rear end of the ego vehicle 50. The front headlights 302a-302b may be configured to provide illumination out towards the front of the ego vehicle 50. A dotted shape 306 is shown in front of the ego vehicle 50 and extending from the front headlights 302a-302b. The dotted shape 306 may represent a range of illumination generated by the front headlights 302a-302b. Similarly, a dotted shape 308 is shown behind the ego vehicle 50 and extending from the rear taillights 304a-304b. The dotted shape 308 may represent a range of illumination generated by the rear taillights 304a-304b. The color, intensity and/or range of light of the front illumination 306 and the rear illumination 308 may be varied according to the design criteria of a particular implementation.

In the example overhead view 300, the capture device 102b, the capture device 102c, the capture device 102e, the capture device 102f, the capture device 102g, the capture device 102h, and the capture device 102i are shown. Each of the capture devices 102a-102i may be directed to capture a different field of view. As shown in association with FIG. 2, the lens 112b of the capture device 102b may capture the field of view 206a-206b to provide a view behind the ego vehicle 50 and the lens 112e of the capture device 102e may capture the field of view 208a-208b to provide a view in front of the ego vehicle 50. Dotted lines 310a-310b are shown extending from the capture device 102c (e.g., from a rear bumper location). The dotted lines 310a-310b may represent the field of view captured by the lens 112c. The field of view 310a-310b may provide a wide angle field of view towards the rear of the ego vehicle 50.

Dotted lines 312a-312b are shown extending from the capture device 102f (e.g., from a rear driver side location). The dotted lines 312a-312b may represent the field of view captured by the lens 112f. The field of view 310a-310b may provide a rear driver side field of view out from the ego vehicle 50. Dotted lines 314a-314b are shown extending from the capture device 102g (e.g., located below the driver side mirror 252a). The dotted lines 314a-314b may represent the field of view captured by the lens 112g. The field of view 314a-314b may provide a driver side field of view out from the ego vehicle 50. Dotted lines 316a-316b are shown extending from the capture device 102h (e.g., from a rear passenger side location). The dotted lines 316a-316b may represent the field of view captured by the lens 112h. The field of view 316a-316b may provide a rear passenger side field of view out from the ego vehicle 50. Dotted lines 318a-318b are shown extending from the capture device 102i (e.g., located below the passenger side mirror 252b). The dotted lines 318a-318b may represent the field of view captured by the lens 112i. The field of view 318a-318b may provide a passenger side field of view out from the ego vehicle 50.

In an example, each of the fields of view captured by the lenses 112a-112n may be presented as video data to the displays 118a-118n and/or analyzed by the processors 106a-106n. The lenses 112a-112n and the corresponding fields of view (e.g., the fields of view 206a-206b, 208a-208b, 310a-310b, 312a-312b, 314a-314b, 316a-316b and 318a-318b) are shown as an illustrative example. In some embodiments, the apparatus 100 may implement four of the capture devices 102a-102n. For example, the capture device 102e implemented on a front of the ego vehicle 50, the capture device 102c implemented on a rear of the ego vehicle 50, the capture device 102g implemented below the driver side view mirror 252a and the capture device 102i implemented below the passenger side view mirror 252b may be sufficient to capture the all-around view 254a-254d. The arrangement of the capture devices 102a-102n may be varied according to the design criteria of a particular implementation.

The processors 106a-106n may be configured to combine the video data captured by the capture devices 102a-102n to form the all-around view 254a-254d. The exterior field of view (e.g., the all-around view 254a-254d) may be a 360 degree field of view (e.g., a field of view that captures video data in all or most directions around the ego vehicle 50, a field of view that surrounds the ego vehicle 50, etc.). Pixel data generated by the capture devices 102a-102i and the corresponding fields of view (e.g., the fields of view 206a-206b, 208a-208b, 310a-310b, 312a-312b, 314a-314b, 316a-316b and 318a-318b) and/or data from other capture devices (e.g., the capture devices 102j-102n, not shown) may be combined to enable the processors 106a-106n to have access to video data over the full 360 degree field of view.

In some embodiments, the processors 106a-106n may be configured to perform video stitching operations and/or de-warping operations to form the 360 degree field of view.

In some embodiments, the processors 106a-106n may be configured to analyze the video data captured by each of the capture devices 102a-102n and aggregate the results to make inferences about all the video data in the all-around view 254a-254d (e.g., the video data from each field of view may be analyzed individually, and the results may be combined to effectively create the 360 degree field of view, even if a single video stream of all 360 degrees around the ego vehicle 50 is never actually created).

In some embodiments, the all-around view 254a-254d may have a generally circular shape for the 360 degree field of view. The particular shape of the 360 degree field of view may not be circular. For example, the range of each of the capture devices 102a-102n may be different. In another example, the physical location of the capture devices 102a-102n on the ego vehicle 50 may determine how far from the ego vehicle 50 the all-around view 254a-254d is able to reach. The available lighting may be a limitation on the range of the all-around view 254a-254d. The 360 degree field of view may have an irregular shape. The range of the 360 field of view may extend farther from the ego vehicle 50 than shown. In some embodiments, the 360 degree field of view may be spherical (e.g., capture the environment above the ego vehicle 50). In some embodiments, the all-around view 254a-254d may not be a full 360 degree field of view (e.g., locations below the ego vehicle 50 may not be captured).

The processors 106a-106n may be further configured to perform computer vision operations on the video data captured in the all-around view 254a-254d (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

Shaded areas 320a-320b are shown. The shaded areas 320a-320b may represent areas of darkness around the ego vehicle 50. The dark areas 320a-320b may be caused by lack of sunlight and/or artificial light. In an example, the dark areas 320a-320b may be caused by the time of day (e.g., lack of sunlight at night). In another example, the dark areas 320a-320b may be caused by a shadow (e.g., an object obstructing sunlight). In yet another example, the dark areas 320a-320b may be caused by an interior environment (e.g., a parking garage may have insufficient artificial lighting). The cause of the dark areas 320a-320b may be varied according to the design criteria of a particular implementation.

The dark areas 320a-320b may result in inaccuracies in the object detection performed by the processors 106a-106n. For example, the dark areas 320a-320b may result in less ambient light being captured by the lenses 112a-112n (e.g., weaker input signals IM_A-IM_B). The dark areas 320a-320b may result in video frames being generated by the processors 106a-106n that have fewer visible details. If the video frames have fewer details visible, then the CNN module 150 may not have sufficient data for analysis to detect objects.

The dark area 320a is shown on the driver side of the ego vehicle 50. The dark area 320a may be partially within the field of view 312a-312b captured by the capture device 102f and/or partially within the field of view 314a-314b captured by the capture device 102g. The dark area 320b is shown on the passenger side of the ego vehicle 50. The dark area 320b may be partially within the field of view 316a-316b captured by the capture device 102h and/or partially within the field of view 318a-318b captured by the capture device 102i. The dark areas 320a-320b may result in the side mounted capture devices (e.g., the capture devices 102f-102i) not receiving sufficient light to clearly capture images.

The dark areas 320a-320b are not shown towards the front of the ego vehicle 50. Generally, the front illumination 306 may provide lighting that may reduce and/or eliminate the dark areas 320a-320b within the range of the front illumination 306. For example, the front headlights 302a-302b may provide sufficient lighting towards the front of the ego vehicle 50 for the front-mounted capture device 102e.

The dark areas 320a-320b are not shown towards the rear of the ego vehicle 50. Generally, the rear illumination 308 may provide lighting that may reduce and/or eliminate the dark areas 320a-320b within the range of the rear illumination 308. For example, the rear taillights 304a-304b may provide sufficient lighting towards the rear of the ego vehicle 50 for the rear-mounted capture device 102c.

Vehicles generally do not have side lighting. While the front headlights 302a-302b and the rear taillights 304a-304b may provide sufficient lighting for the capture devices 102a-102n towards the front and rear of the ego vehicle 50, the dark areas 320a-320b may remain at the sides of the ego vehicle 50. The dark areas 320a-320b may reduce visibility in portions of the all-around view 254a-254d.

Computer vision may be the primary source of data for the apparatus 100 to understand the environment around the ego vehicle 50. The sensor fusion module 152 may be configured to combine information about the objects detected from analyzing the video data captured with a detection of objects using the proximity sensors (e.g., one or more of the sensors 114 configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114, the distance limitations of the sensors 114, whether the computer vision detects the object at a distance beyond the range of the sensors 114, etc.).

The ego vehicle 50 may implement the apparatus 100 that enables computer vision and 360 degree cameras to provide the all-around view 254a-254d and the additional sensors 114 (e.g., such as ultrasonics, radars, gyroscope, accelerometer, etc.). The additional sensors 114 may provide supplemental information about the environment near the ego vehicle 50. Some of the supplemental information may provide data about objects/obstacles near the ego vehicle 50 that the capture devices 102a-102n may not be capable of detecting because of the dark areas 320a-320b. However, the additional sensors 114 may not provide sufficient information for all autonomous driving maneuvers. Furthermore, if the dark areas 320a-320b prevent computer vision operations, the results of the computer vision analysis may not be available to provide redundancy and/or error-checking for the sensors 114.

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to autonomously (e.g., avoid collisions, provide warnings, store information, avoid roadway hazards such as potholes, etc.). For example, whether a detected scenario is considered an event may be determined by the decision module 158. In one example, the event may correspond to detecting a scenario that may correspond to an autonomous driving maneuver (e.g., detecting a parking spot). The events may be detected based on the computer vision operations performed on the video data captured using the capture devices 102a-102n. The events may be detected based on readings from the sensors 114. For example, the sensor fusion module 152 may be configured to combine information determined using the computer vision operations and information detected using the sensors 114 to make inferences that may be used by the decision module 158.

Figure 5:
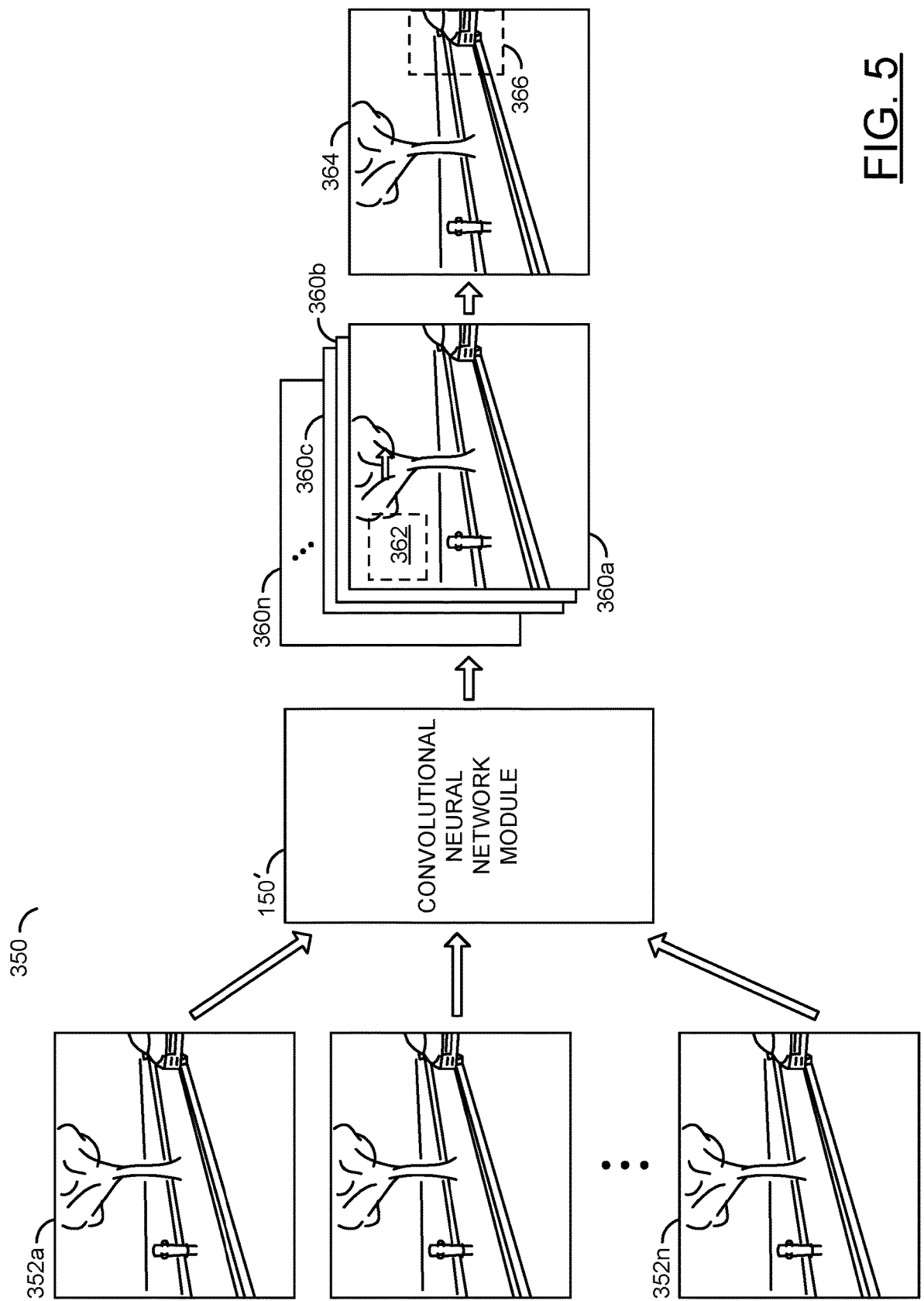
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the ego vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of a parallel parking spot (e.g., captured from a side camera of the ego vehicle 50). For example, the training data 352a-352n may be a sequence of video frames captured prior to the processors 106a-106n determining whether to perform a vehicle maneuver (e.g., automatically parallel parking, performing lane-keeping, pulling out of a parking space, etc.). The training data 352a-352n may be labeled based on whether the prediction was incorrect or correct. Using the training data 352a-352n (e.g., video frames captured from many different vehicles as the vehicles are produced), many training data sets may be available to train the CNN module 150'. In an example, different makes and models of vehicles may be analyzed. In another example, different interior colors may be analyzed. In yet another example, different drivers (e.g., different people) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features, vehicles, pedestrians, etc.) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352*a*-352*n* may be varied according to the design criteria of a particular implementation.

The CNN module 150' may receive and analyze input images (e.g., the training data 352*a*-352*n*) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150' may enable information sharing between components of the processors 106*a*-106*n*. The color detection process may be used to extract features from the training data 352*a*-352*n*.

The color detection and/or feature extraction process is generally operational to determine a color likelihood value that pixels in each pixel location of an input image (e.g., the training data 352*a*-352*n* during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102*a* and/or the lens 112*a*) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360*a*-360*b*. The feature extraction window 362 may consider a pixel of interest. In an example, the pixel of interest may be a current pixel location being color classified. The feature extraction window 362 may generally represent a local context and contrast around the pixel of interest.

The pixels of the training data 352*a*-352*n* may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 364. The reference video frame 364 may comprise masks and/or categorized instances of the reference objects 366. The reference objects 366 may be objects that have been sufficiently defined to enable reliable recognition using computer vision.

The processors 106*a*-106*n* may generate images that provide better image processing that allows "seeing" objects in very challenging environments (e.g., very dark and/or bright sun into the camera). The processors 106*a*-106*n* may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100 in a fleet of vehicles. The CNN module 150' may continue to receive the training data 352a-352n from each apparatus 100, refine the machine learning model, and then provide updates to the machine learning model for each apparatus 100. The centralized CNN module 150' may develop, refine and/or enhance the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 6:
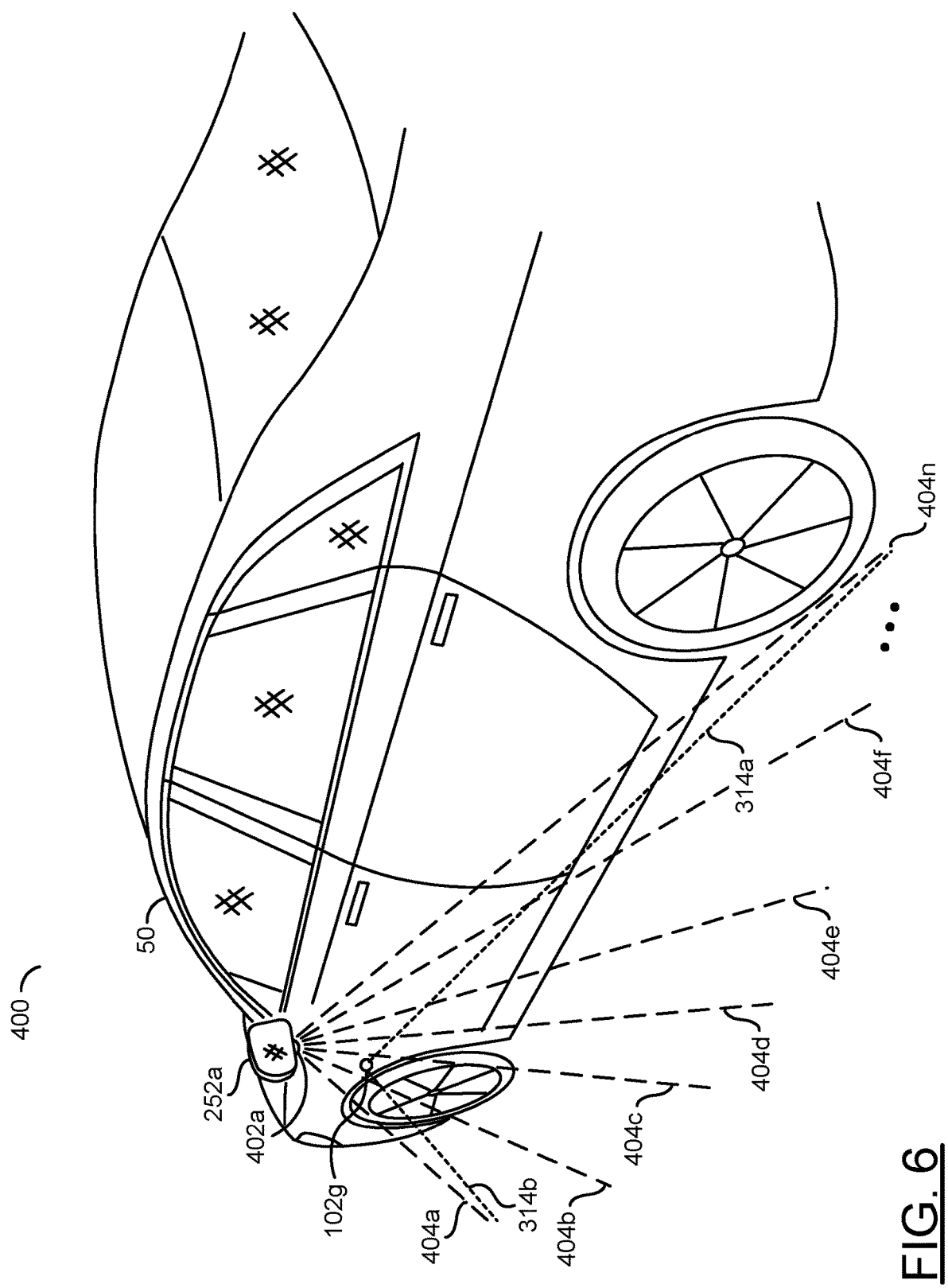
FIG. 6 is a diagram illustrating illumination provided by an illumination device.

Referring to FIG. 6, a diagram illustrating illumination provided by an illumination device is shown. An external view 400 of the ego vehicle 50 is shown. The external view 400 may comprise a view of the driver side of the ego vehicle 50. The driver side view mirror 252a is shown extending from the driver side of the ego vehicle 50. The capture device 102g is shown implemented on a side of the ego vehicle 50. The capture device 102g is shown at a level below the driver side view mirror 252a. The field of view 314a-314b of the capture device 102g is shown.

An illumination device 402a is shown. The illumination device 402a may be attached to the driver side view mirror 252a. While the driver side of the ego vehicle 50 is shown as a representative example, an illumination device 402b (not shown) may be similarly implemented above the capture device 102i on the passenger side of the ego vehicle 50. The illumination devices 402a-402b may be configured to generate light. In one example, the illumination devices 402a-402b may be configured to emit light in a visible spectrum. In another example, the illumination devices 402a-402b may comprise a combination of visible light and infrared light. The illumination devices 402a-402b may be implemented as light-emitting diodes (LEDs). The illumination devices 402a-402b may be low-cost and low-power consumption devices. The implementation of the illumination devices 402a-402b may be varied according to the design criteria of a particular implementation.

Dotted lines 404a-404n are shown extending from the illumination device 402a. The dotted lines 404a-404n may be a visual representation of light emitted by the illumination device 402a. The range of the light emission 404a-404n may generally cover the range of the field of view 314a-314b of the capture device 102g. For example, the illumination 404a-404n may provide a light source for the field of view 314a-314b of the capture device 102g. Similarly, the illumination 404a-404n generated by the illumination device 402b may provide a light source for the field of view 318a-318b of the capture device 102i.

The illumination devices 402a-402b may be located above a level of the respective capture devices (e.g., the capture device 102g on the driver side and the capture device 102i on the passenger side). The illumination 404a-404n may be directed downwards and outwards from the side of the ego vehicle 50. For example, the illumination 404a-404n generated by the illumination device 402a may be directed generally across (e.g., perpendicular to) the field of view 314a-314b (e.g., generally directed outwards from the driver side of the ego vehicle 50) and towards the ground. Similarly, the illumination 404a-404n generated by the illumination device 402b may be directed generally across (e.g., perpendicular to) the field of view 318a-318b (e.g., generally directed outwards from the passenger side of the ego vehicle 50) and towards the ground.

While the dotted lines 404a-404n representing the illumination generated by the illumination device 402a are shown generally directed downwards, the illumination 404a-404n may be directed outwards from the driver side of the ego vehicle 50. Similarly, the illumination 404a-404n generated by the illumination device 402b may be directed outwards from the passenger side of the ego vehicle 50.

The illumination 404a-404n generated by illumination devices 402a-402b may be configured to reduce an amount of the dark areas 320a-320b near the ego vehicle 50. For example, similar to the headlights 302a-302b providing the light range 306 and the taillights 304a-304b providing the light range 308 to eliminate the dark areas 320a-320b towards the front and the rear of the ego vehicle 50, the illumination 404a-404n generated by the illumination devices 402a-402b may reduce the dark areas 320a-320b towards the sides of the ego vehicle 50.

The illumination 404a-404n may reduce and/or eliminate the dark areas 320a-320b on the driver side of the ego vehicle 50 and the passenger side of the ego vehicle 50. The illumination 404a-404n may provide ambient light to improve visibility in the field of view 314a-314b of the capture device 102g and the field of view 318a-318b of the capture device 102i (and other capture devices that may be implemented on the sides of the ego vehicle 50). By reducing the dark areas 320a-320b (e.g., reducing the amount of darkness, increasing brightness, increasing a distance of visibility, etc.), the illumination devices 402a-402b may facilitate computer vision operations performed by the processors 106a-106n. For example, the increased brightness may enable the capture devices 102a-102n to capture pixel data that may be used by the processors 106a-106n to generate video frames with a greater amount of visible detail compared to when the dark areas 320a-320b are present. The visible detail may enable the CNN module 150 to detect objects with increased clarity. The increased clarity may improve a confidence level of the results of the computer vision operations. The increased confidence level may enable objects/obstacles to be located. The knowledge of the types and/or locations of the objects detected using computer vision may enable the processors 106a-106n to generate data that may be used to enable the ego vehicle 50 to perform autonomous vehicle maneuvers.

The illumination devices 402a-402b may be implemented on the side view mirrors 252a-252b. The side view mirrors 252a-252b may generally be located below a face level of a person standing near the ego vehicle 50. Since the illumination 404a-404n may be directed downwards and outwards from a location that is above the capture device 102g but still below face level of a person, the illumination 404a-404n may not be directed towards a face or eyes of people near the ego vehicle 50. For example, the illumination 404a-404n generated by the illumination devices 402a-402b may not cause a blinding effect to nearby people and/or drivers of other vehicles.

Figure 7:
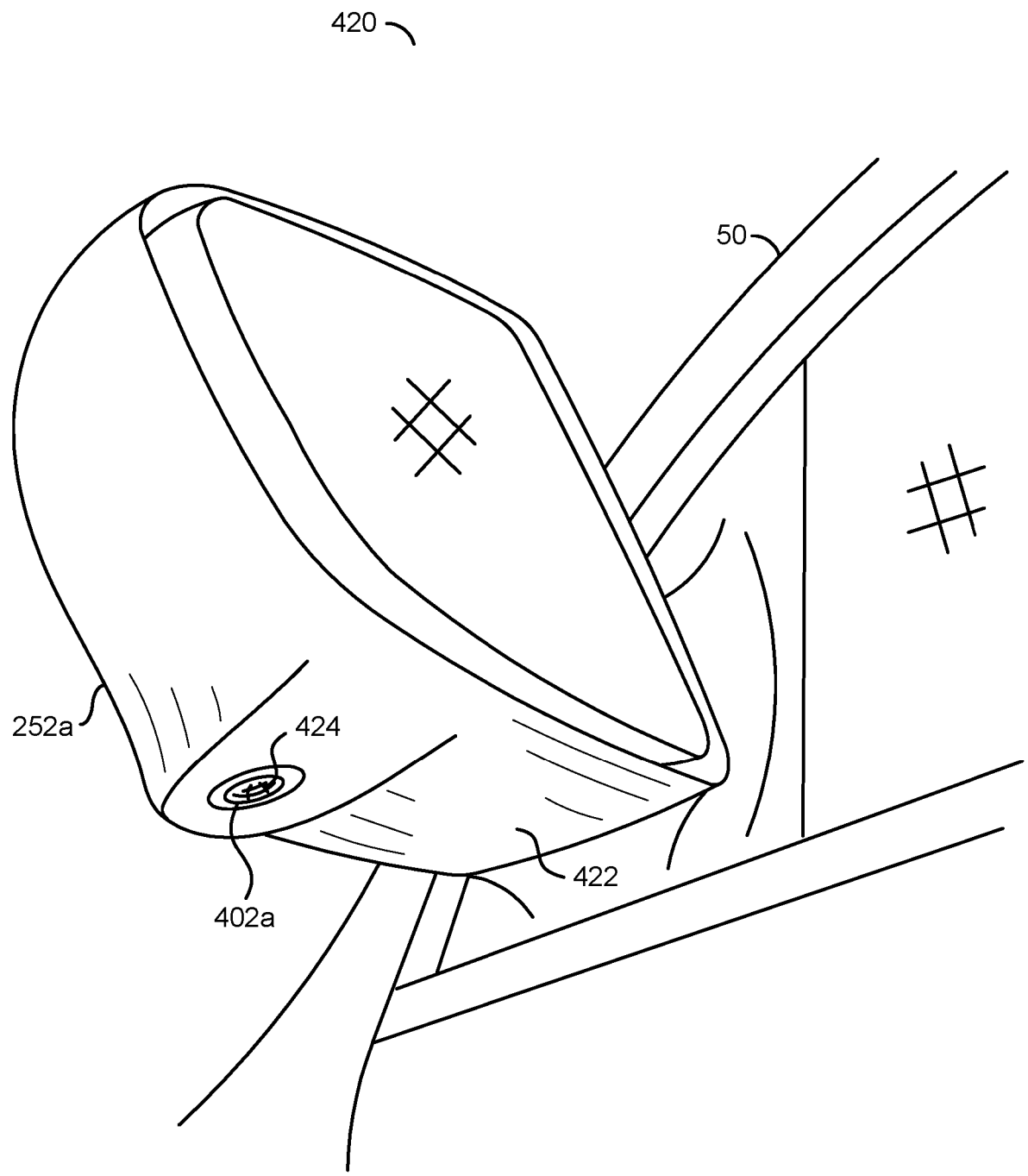
FIG. 7 is a diagram illustrating an example implementation of an illumination device.

Referring to FIG. 7, a diagram illustrating an example implementation of an illumination device is shown. A view 420 is shown. The view 420 may provide an external view of the ego vehicle 50. The external view 420 may provide a perspective from below the driver side view mirror 252a.

The view 420 may comprise a portion of the ego vehicle 50 (e.g., a portion of the driver side door). The view 420 may comprise the driver side view mirror 252a. The illumination device 402a is shown implemented as a component of the driver side view mirror 402a. While the driver side view mirror 252a and the illumination device 402a are shown in the example view 420, the illumination device 402b may be similarly implemented on the passenger side of the ego vehicle 50.

A bottom surface 422 of the side view mirror 252a is shown. The illumination device 402a may be implemented on and/or partially within the bottom surface 422 of the side view mirror 252a. Implementing the illumination devices 402a-402b on the bottom surface 422 of the side view mirrors 252a-252b may enable the illumination 404a-404n to be directed downwards and outwards. The bottom surface 422 may be located at a level above the side mounted capture devices 102g and 102i.

A textured lens 424 is shown. The textured lens 424 may provide a cover for the light-emitting diode element(s) of the illumination devices 402a-402b. In some embodiments, the textured lens 424 may comprise a dome shape cover for the lighting elements of the illumination devices 402a-402b. In one example, the textured lens 424 may provide protection for the illumination devices 402a-402b (e.g., a water-tight seal, a protective shell to prevent impacts, etc.). In another example, the textured lens 424 may provide diffraction, diffusion and/or redirection of the light generated by the LED elements of the illumination devices 402a-402b. The textured lens 424 may be configured to apply a pattern effect to the light 404a-404n. For example, the pattern effect may provide a structured light pattern and/or an optical structure.

The textured lens 424 may enable the light 404a-404n to project a texture on the ground and/or nearby objects. The texture effect (or pattern) projected by the light 404a-404n may facilitate processing of stereo pairs of images. In one example, the capture devices 102a-102n may comprise a stereo pair of cameras (e.g., a stereo camera). The stereo pair of cameras may capture stereo pairs of images that may be analyzed by the disparity engine 164. Generally, processing of stereo pairs of images by the disparity engine 164 may be more accurate (e.g., measure of distance to an object, detect a location of an object, etc.) when the environment analyzed has texture compared to an environment that does not have a texture. Implementing the lens 424 to enable projecting the texture with the light 404a-404n may help the obstacle detection process. Details of the illumination devices 402a-402b and/or the textured lens 424 may be described in association with U.S. patent application Ser. No. 16/437,280 filed on Jun. 11, 2019, appropriate portions of which are hereby incorporated by reference.

The texture projected by using the textured lens 424 may provide a random texture pattern. The light 404a-404n may be light in the visible light spectrum. The processors 106a-106n may be configured to adjust the light 404a-404n projected. In an example, the signal VCTRL may be generated by the processors 106a-106n to adjust the light 404a-404n projected by the illumination devices 402a-402b. The processors 106a-106n may be configured to adjust the light 404a-404n to implement display of a graphic, adjust a color, provide a pulsing/strobing effect and/or adjust an intensity. Adjusting the light 404a-404n may be implemented to help the stereo processing. Adjusting the light 404a-404n may be implemented to help people nearby the ego vehicle 50 to understand what the ego vehicle 50 may be doing and/or how the processors 106a-106n may be interpreting the environment.

In one example, the processors 106a-106n may adjust the light 404a-404n to a dim intensity when the decision module 158 determines that no objects are near the ego vehicle 50. In another example, the processors 106a-106n may increase an intensity of the light 404a-404n and/or change a color of the light 404a-404n when an object is determined to be within a particular distance from the ego vehicle 50. For example, changing the color of the light 404a-404n to a red color may indicate an object has been detected near the ego vehicle 50 and the intensity of the red color may increase as the object moves closer to the ego vehicle 50. In yet another example, the color selected for the light 404a-404n may change based on the type of object detected. For example, the processors 106a-106n may change the color of the light 404a-404n to a red color when the decision module 158 determines that the detected object is a pedestrian and change the color of the light 404a-404n to a yellow color when the decision module 158 determines that the detected object is another vehicle. The types of adjustment to the light 404a-404n based on detecting objects, the types of objects and/or the characteristics of objects may be varied according to the design criteria of a particular implementation.

Similarly, the processors 106a-106n may adjust the light 404a-404n based on the particular vehicle maneuver and/or a status of the ego vehicle 50. Adjusting the light 404a-404n may be a form of communication to people near the ego vehicle 50 (e.g., to help people to understand intentions of the ego vehicle 50 and/or anticipate movements by the ego vehicle 50). In one example, the color of the light 404a-404n may be a neutral white when the ego vehicle 50 is in a parked and/or idling position. In another example, when the ego vehicle 50 changes a mode of operation to initiate a vehicle maneuver such as pulling out of a parking spot, the light 404a-404n may be adjusted by the processors 106a-106n to flash and/or change to a different color.

Figure 8:
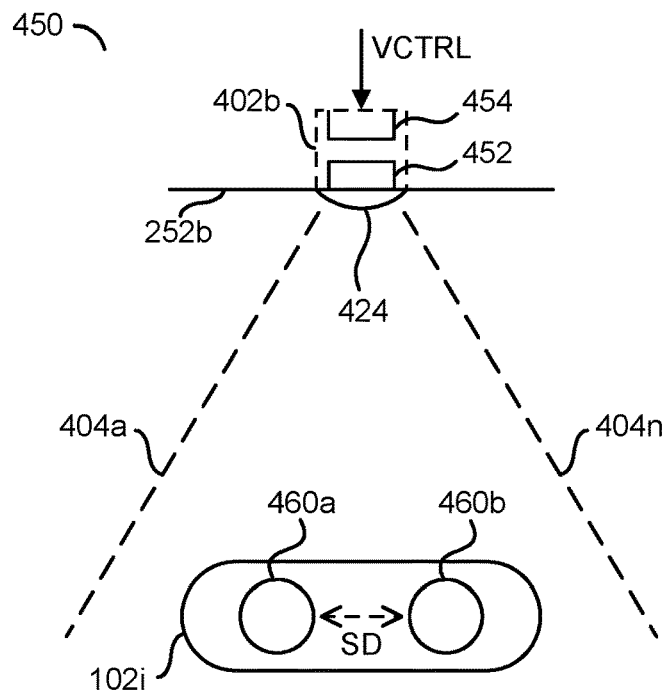
FIG. 8 is a diagram illustrating illumination provided for an example stereo camera pair.

Referring to FIG. 8, a diagram illustrating illumination provided for an example stereo camera pair is shown. An example representation 450 is shown. The example representation 450 may comprise a portion of the passenger side view mirror 252b and the passenger side capture device 102i. The passenger side view mirror 252b may be located at a level above the capture device 102i. The distance between the passenger side view mirror 252b and the capture device 102i in the example representation 450 may be an illustrative example. In an example, there may be a greater distance between the height of the passenger side view mirror 252b and the capture device 102i than shown in the example representation 450.

The passenger side illumination device 402b is shown within the passenger side view mirror 252b. The textured lens 424 of the passenger side illumination device 402b is shown extending from the passenger side view mirror 252b. The textured lens 424 is shown having a general dome shape. The light 404a-404n is shown being projected by the illumination device 402b.

A front view of the capture device 102i is shown. In the example representation 450 shown, the field of view 318a-318b of the capture device 102i may be directed out from the drawing sheet. The light 404a-404n generated by the illumination device 402b is shown directed down in front of the capture device 102i. In an example, the light 404a-404n may be projected in a direction that may be approximately perpendicular to the field of view 318a-318b of the capture device 102i. For example, the illumination device 402b may be located above the capture device 102i and project the light 404a-404n downwards on the capture device 102i and the field of view 318a-318b.

The capture device 102i is shown comprising a stereo pair of cameras 460a-460b (e.g., a stereo camera). The stereo pair of cameras 460a-460b may be implementations of two of the lenses 112a-112n. For example, the capture device 102i may comprise two of the image sensors 140a-140n and/or two of the lenses 112a-112n to create a stereo pair of cameras 460a-460b. A distance (e.g., SD) is shown between the stereo pair of cameras 460a-460b. The stereo pair distance SD may be a distance that may be known in advance to the processors 106a-106n and/or the disparity engine 164. While the stereo pair of cameras 460a-460b may appear generally flat in the representative example 450, the stereo pair of cameras 460a-460b may be angled inwards. The inwards angle of the stereo pair of cameras 460a-460b may be known in advance to the processors 106a-106n and/or the disparity engine 164. In the example representation 450, the stereo pair of cameras 460a-460b may have a horizontal orientation.

The stereo pair of cameras 460a-460b may be configured to capture pairs of synchronized images (e.g., images captured at the same time). Since the distance SD may be a small distance, the pairs of synchronized images may capture images of the same scene, environment and/or objects from slightly different perspectives. The disparity engine 164 may be configured to analyze the pairs of synchronized images. The disparity engine 164 may use the distance SD and/or the inward angle of the stereo pair of cameras 460a-460b to detect differences between the same objects. The disparity engine 164 may calculate the differences between the same objects with respect to the distance SD and/or the inward angle to determine a distance of objects from the capture device 102i and/or a location of objects with respect to the capture device 102i. The processors 106a-106n may use the distances and/or locations calculated by the disparity engine 164 as part of the computer vision operations to detect objects in the environment near the ego vehicle 50. Additional details of stereo imaging may be described in association with U.S. patent application Ser. No. 16/722,131, filed on Dec. 20, 2019, appropriate portions of which are hereby incorporated by reference.

The illumination device 402b may comprise a block (or circuit) 452 and/or a block (or circuit) 454. The circuit 452 may implement a light-emitting diode. The circuit 454 may be a light control circuit. The illumination device 402b is shown receiving the signal VCTRL. The illumination device 402b may comprise other components and/or send/receive other signals (not shown). The number, type and/or arrangement of the components of and/or the signals sent/received by the illumination devices 402a-402b may be varied according to the design criteria of a particular implementation.

The light-emitting diode 452 may be configured to generate the light 404a-404n. The light-emitting diode 452 may be a low-powered device. For example, the light-emitting diode 452 may be configured to generate light with a textured pattern while consuming lower power than a laser device. The light-emitting diode 452 may be configured to project a light with a range of approximately eight to ten meters. The light-emitting diode 452 may be configured to generate white light and/or colored light (RGB lighting). While one light-emitting diode 452 is shown, the illumination devices 402a-402b may comprise multiple light-emitting diodes.

The light control circuit 454 may be configured to control the light-emitting diode 452. The light control circuit 454 may be an example of one of the actuators 116. The light control circuit 454 may be configured to receive the signal VCTRL. The light control circuit 454 may be configured to interpret the signal VCTRL to enable the processors 106a-106n to provide instructions for controlling the illumination devices 402a-402b. In an example, the light control circuit 454 may be configured to adjust a color, an intensity, a brightness, a frequency, etc. of the light 404a-404n generated by the light-emitting diode 452 in response to the signal VCTRL. In some embodiments, the light control circuit 454 may be configured to provide data back to the processors 106a-106n (e.g., operate as one of the sensors 114). The data communicated from the light control circuit 454 to the processors 106a-106n may provide an operating status of the illumination devices 402a-402b (e.g., a current color of the light 404a-404n, a current intensity of the light 404a-404n, whether the illumination devices 402a-402b are operational, etc.).

Figure 9:
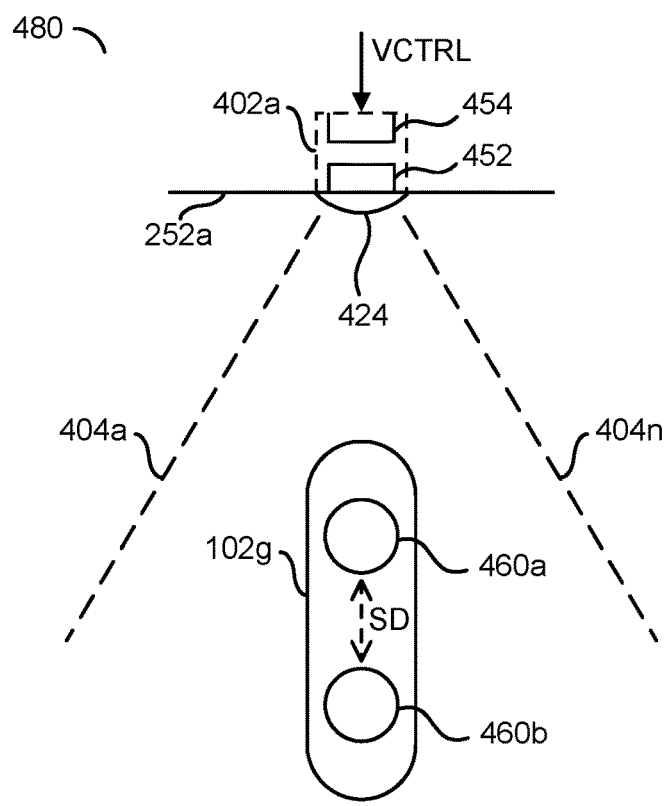
FIG. 9 is a diagram illustrating illumination provided for an alternate example stereo camera pair.

Referring to FIG. 9, a diagram illustrating illumination provided for an alternate example stereo camera pair is shown. An example representation 480 is shown. The example representation 480 may comprise a portion of the driver side view mirror 252a and the driver side capture device 102g. The example representation 480 of the driver side view mirror 252a and the driver side capture device 102g may have a similar configuration as the passenger side view mirror 252b and the passenger side capture device 102i shown in association with FIG. 8.

The example representation 480 may comprise the illumination device 402a, the light 404a-404n and/or the textured dome lens 424. The illumination device 402a is shown receiving the signal VCTRL from the processors 106a-106n (or the interface 104). The illumination device 402a is shown comprising the light-emitting diode 452 and the light control circuit 454.

The capture device 102g is shown comprising the stereo pair of cameras 460a-460b. The distance SD is shown between the stereo pair of cameras 460a-460b. In the example shown, the capture device 102g may have a vertical orientation. In the vertical orientation of the capture device 102g, one of the stereo pairs of cameras 460a may be located above the other of the stereo pairs of cameras 460b. The driver side capture device 102g may be implemented having the same orientation as the passenger side capture device 102i (e.g., both with a horizontal orientation or both with a vertical orientation). The driver side capture device 102g may be implemented having a different orientation than the passenger side capture device 102i (e.g., one with a horizontal orientation and the other with a vertical orientation). The orientation of the stereo pairs of cameras 460a-460b for the various capture devices 102a-102n may be varied according to the design criteria of a particular implementation.

Figure 10:
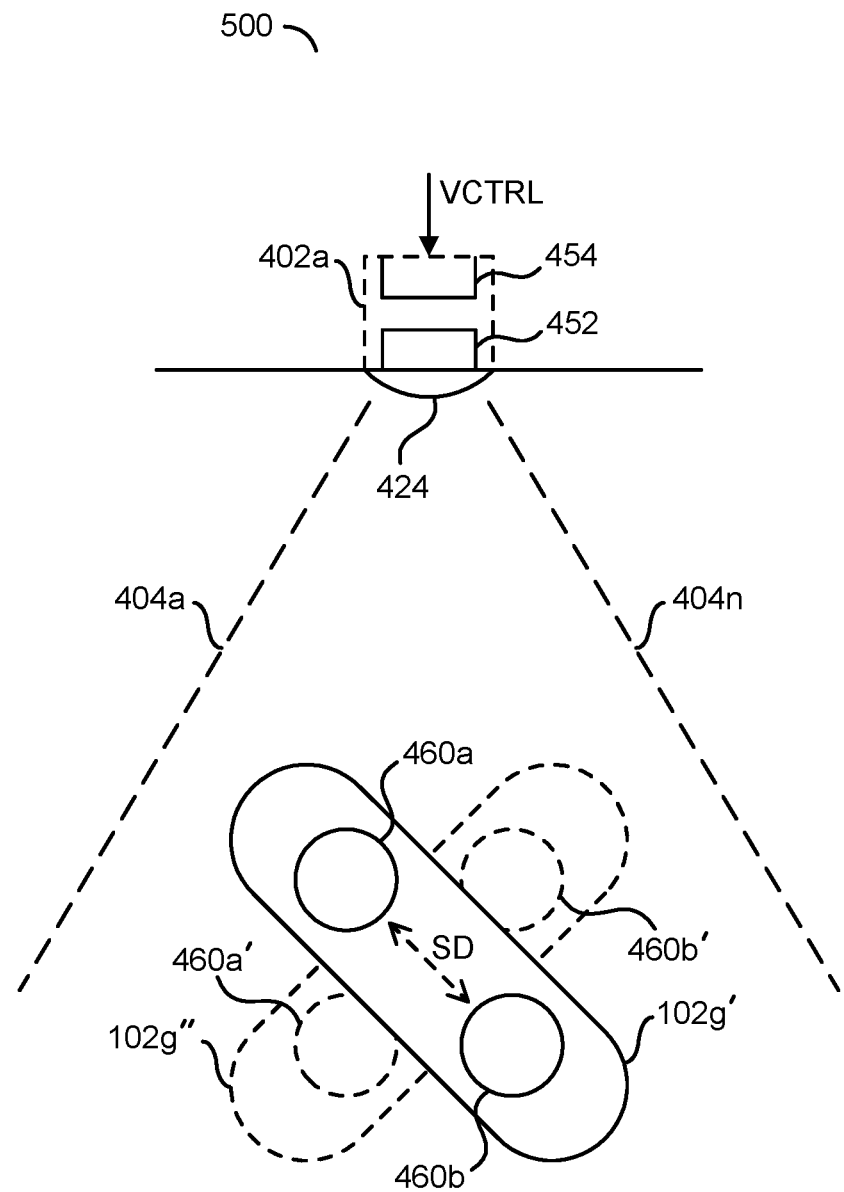
FIG. 10 is a diagram illustrating illumination provided for alternate configurations of stereo camera pairs.

Referring to FIG. 10, a diagram illustrating illumination provided for alternate configurations of stereo camera pairs is shown. An example representation 500 is shown. The example representation 500 may comprise a portion of the driver side view mirror 252a and the driver side capture device 102g'. The example representation 500 of the driver side view mirror 252a and the driver side capture device 102g' may have a similar configuration as the passenger side view mirror 252b and the passenger side capture device 102i shown in association with FIG. 8.

The example representation 500 may comprise the illumination device 402a, the light 404a-404n and/or the textured dome lens 424. The illumination device 402a is shown receiving the signal VCTRL from the processors 106a-106n (or the interface 104). The illumination device 402a is shown comprising the light-emitting diode 452 and the light control circuit 454.

The capture device 102g' is shown comprising the stereo pair of cameras 460a-460b. The distance SD is shown between the stereo pair of cameras 460a-460b. In the example shown, the capture device 102g' may have a diagonal orientation. In the diagonal orientation of the capture device 102g', one of the stereo pairs of cameras 460a may be located above and to the left of the other of the stereo pairs of cameras 460b.

An alternate orientation of the capture device 102g" is shown comprising the stereo pair of cameras 460a'-460b'. In the example shown, the capture device 102g' may have an alternate diagonal orientation. In the alternate diagonal orientation of the capture device 102g", one of the stereo pairs of cameras 460a' may be located below and to the left of the other of the stereo pairs of cameras 460b'.

The diagonal orientation of the capture device 102g' and the alternate diagonal orientation of the capture device 102g" are shown in the example representation 500 as representative examples of orientations of the capture devices 102a-102n. The orientation of the capture devices 102a-102n may be diagonal, vertical, horizontal and/or any other angle. Regardless of the orientation of the stereo camera pairs 460a-460b, the disparity engine 164 may have prior data stored about the orientation of the stereo camera pairs 460a-460b, the distance SD and/or the inward angle of the stereo camera pairs 460a-460b. The prior data stored may enable the disparity engine 164 to perform the calculations to properly account for the differences between the stereo camera pairs 460a-460b to track the slight differences in location of the detected objects within the synchronized pair of video frames generated. The disparity engine 164 may account for various differences in orientation to determine a distance, location and/or size of objects captured in the video frames generated from the pixel data captured by the capture devices 102a-102n.

Figure 11:
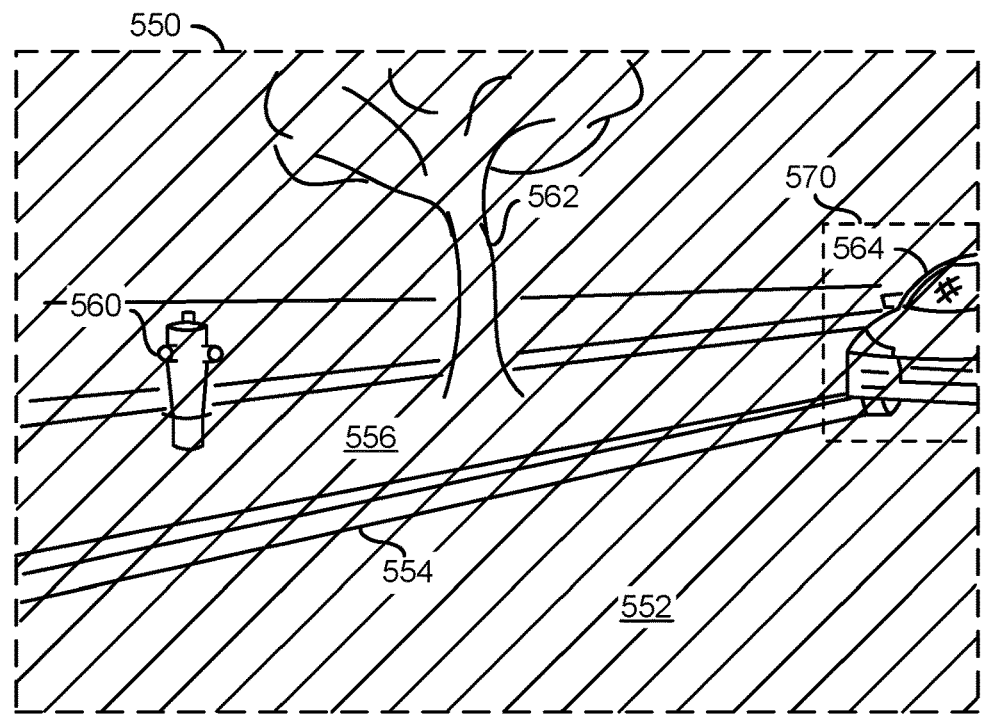
FIG. 11 is a diagram illustrating performing object detection in a video frame captured in a dark environment.

Referring to FIG. 11, a diagram illustrating performing object detection in a video frame captured in a dark environment is shown. An example video frame 550 is shown. The example video frame 550 may be a representative example of a video frame from a sequence of video frames generated in response to pixel data captured by the capture devices 102a-102n. In an example, the ego vehicle 50 may implement four stereo camera pairs (e.g., the front stereo camera pair capture device 102e, the back stereo camera pair capture device 102c, the driver side stereo camera pair capture device 102g and the passenger side stereo camera pair capture device 102i). Generally, the stereo pairs of cameras implemented on the ego vehicle 50 may work as expected (e.g., capture video data that may be used to detect objects and/or determine distances to objects) during the day but may have problems (e.g., not detecting objects, classifying objects incorrectly, misjudging distances between the ego vehicle 50 and the detected object, etc.) during the night and/or in dark environments.

The example video frame 550 may provide a side view with respect to the ego vehicle 50. In the example shown, the example video frame 550 may be a video frame generated in response to pixel data captured by the passenger side stereo capture device 102i. The example video frame 550 is shown with shading across the video frame 550. The shading of the example video frame 550 may represent a dark environment. For example, the example video frame 550 may capture the dark area 320b shown in association with FIG. 4.

The example video frame 550 may comprise a view of the environment near the ego vehicle 50. The example video frame 550 may comprise a road 552, a curb 554 and a sidewalk area 556. The road 552 may be the road surface that the ego vehicle 50 may be currently driving on. The road 552 shown may be the road surface next to the passenger side of the ego vehicle 50. The curb 554 may separate the road from the sidewalk area 556 (e.g., an area where the ego vehicle 50 may not be intended to, or permitted to, drive on). The curb 554 may be an indication of a location where the ego vehicle 50 may autonomously perform parallel parking. In an example, the parallel parking may be an example of a vehicle maneuver. For example, the processors 106a-106n may perform the object detection to detect the curb 554 and an open space on the roadway 552 and the decision module 158 may determine that the ego vehicle 50 may park next to the curb 554.

The example video frame 550 may further comprise an object 560, an object 562 and an object 564. The object 560 may be a fire hydrant. The object 562 may be a tree. The object 564 may be a vehicle. The fire hydrant 560 may be located on the sidewalk area 556. The tree 562 may be located on the sidewalk area 556. The vehicle 564 may be parked on the road 552.

A dotted box 570 is shown around the vehicle 564. The dotted box 570 may represent computer vision operations performed by the processors 106a-106n. For example, the CNN module 150 may detect the vehicle 564. In an example, the dotted box 570 may be a visual representation of the object detection (e.g., the dotted box 570 may not appear on an output video frame displayed on one of the displays 118a-118n). In another example, the dotted box 570 may be a bounding box generated by the processors 106a-106n displayed on the video frame to indicate that an object has been detected (e.g., the bounding box 570 may be displayed in a debug mode of operation).

The object detection box 570 is shown for the vehicle 564, but not for the fire hydrant 560 or the tree 562. The dark areas 320a-320b may negatively affect the object detection capability of the processors 106a-106n. For example, in a well-lit environment, the processors 106a-106n may detect the fire hydrant 560, the tree 562 and the vehicle 564. However, in the dark environment, the processors 106a-106n may not detect all of the objects 560-564, may not properly classify the objects 560-564, may not determine relevant characteristics of the objects 560-564 and/or may not accurately calculate a distance between the ego vehicle 50 and the objects 560a-564. In an example, the processors 106a-106n may perform the detection 570 on the vehicle 564, but the dark areas 320a-320b may prevent the determination of whether the vehicle 564 is on the road 552 or the sidewalk area 556. In another example, the processors 106a-106n may detect the fire hydrant 560 but the dark areas 320a-320b may prevent the classification of the fire hydrant 560 (e.g., the object may be improperly classified as a pedestrian).

The object detection performed by the CNN module 150 may comprise a confidence level. The confidence level may provide an indication of how likely that the results of the object detection are accurate. For example, a low confidence level may indicate that the results of the object detection may be unreliable (e.g., inaccurate, have errors, etc.) and a high confidence level may indicate that the results of the object detection may be reliable (e.g., other systems of the ego vehicle 50 may use the results of the object detection, the processors 106a-106n may generate signals such as the signal VCTRL based on the results of the object detection, etc.). The memory 108 may store pre-determined confidence level thresholds for various functions of the processors 106a-106n.

The confidence level threshold may comprise a value of the confidence level of the results generated by the CNN module 150 that may be considered to be reliable (e.g., unreliable results below the confidence level threshold and reliable results above the confidence level threshold). In an example, if the processors 106a-106n detect the fire hydrant 560, the tree 562 and/or the vehicle 564 with a confidence level greater than the threshold value, then the processors 106a-106n may generate the signal VCTRL to enable the vehicle maneuver. In the example shown, the processors 106a-106n may detect the vehicle 564 with a low confidence level and the fire hydrant 560 and the tree 562 may not be detected. Since the confidence level based on the computer vision of the analysis of the example video frame 550 may be below the threshold value, then the processors 106a-106n may not have sufficient information to enable autonomous control of the ego vehicle 50.

In one example, the processors 106a-106n may detect the open space on the road 552 in front of the vehicle 564. However, the dark area 320b may prevent the ego vehicle 50 from detecting the fire hydrant 560. Based on incomplete information, the decision module 158 may incorrectly determine that the vehicle maneuver to parallel park may be performed (e.g., which may lead to a ticket for parking in front of the fire hydrant 560).

Figure 12:
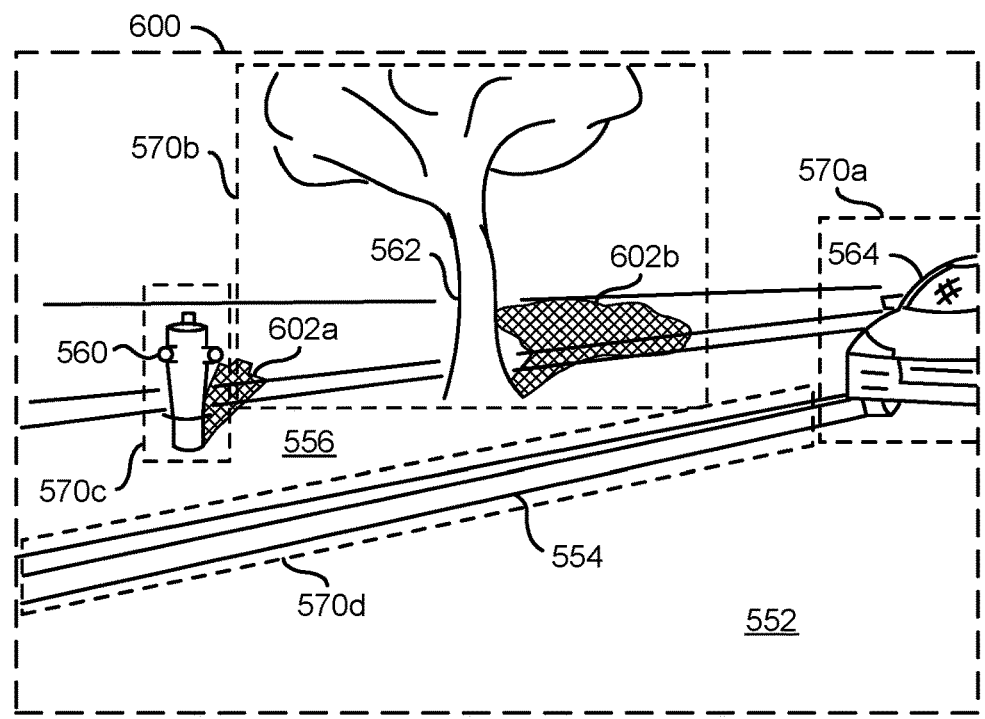
FIG. 12 is a diagram illustrating performing object detection in a video frame captured in an environment illuminated by an illumination device.

Referring to FIG. 12, a diagram illustrating performing object detection in a video frame captured in an environment illuminated by an illumination device is shown. An example video frame 600 is shown. The example video frame 600 may be a representative example of a video frame from a sequence of video frames generated in response to pixel data captured by the capture devices 102a-102n. The example video frame 600 may be similar to the example video frame 550 shown in association with FIG. 11.

The example video frame 600 may provide a side view with respect to the ego vehicle 50. In the example shown, the example video frame 600 may be a video frame generated in response to pixel data captured by the passenger side stereo capture device 102i. The example video frame 600 is shown without the shading shown in the example video frame 550. The shading of the example video frame 600 may represent an environment that has been illuminated by the illumination devices 402a-402b. For example, the example video frame 600 be a video frame of the area on the passenger side of the ego vehicle 50 when the dark area 320b has been illuminated by the light 404a-404n generated by the passenger side illumination device 402b implemented on the passenger-side mirror 252b.

In the example video frame 600, the road 552, the curb 554 and the sidewalk area 556 are shown illuminated by the light 404a-404n. In the example video frame 600, the fire hydrant 560, the tree 562 and the vehicle 564 are shown illuminated by the light 404a-404n. The light 404a-404n generated by the illumination devices 402a-402b may improve a success rate and/or confidence level of results of object detection performed by the processors 106a-106n on the illuminated video frame 600 compared to performing similar analysis on the dark video frame 550.

Dotted boxes 570a-570d are shown. The light 404a-404n may enable the CNN module 150 to detect more objects. The detection 570a may represent a detection of the vehicle 564. The detection 570b may represent a detection of the tree 562. The detection 570c may represent a detection of the fire hydrant 560. The detection 570d may represent a detection of the curb 554. With the illumination 404a-404n, the processors 106a-106n may detect other objects and/or additional characteristics of objects. The number and/or types of objects detected by the processors 106a-106n may be varied according to the design criteria of a particular implementation.

The light 404a-404n generated by the illumination device 402b may enable the pixel data captured by the capture device 102i to provide a more detailed view (e.g., compared to when the dark areas 320b are present). The detailed view may enable the processors 106a-106n to detect the curb 554 and the objects 560-564 with a high confidence level in the results of the computer vision analysis. The confidence level of the results of the object detection 570a-570d may be above the confidence level threshold. The detections 570a-570d may provide sufficient information to enable the processors 106a-106n to generate the signal VCTRL (e.g., to enable autonomous vehicle maneuvers by the ego vehicle 50).

A shape 602a and a shape 602b are shown. The shapes 602a-602b may be shadows. The shadow 602a may be a shadow cast by the fire hydrant 560. The shadow 602b may be a shadow cast by the tree 562. The shadows 602a-602b may be caused in response to the light 404a-404n. For example, when the illumination devices 402a-402b project the light 404a-404n on the objects 560-562, the shadows 602a-602b may be created.

Implementing the illumination devices 402a-402b on the side view mirrors 252a-252b above the stereo cameras may enable the light 404a-404n to provide illumination of the dark areas 320a-320b from a high position. For example, the source of the illumination 404a-404n may be relatively far from the camera 102g and the camera 102i (e.g., the illumination device 402b may be located on the side view mirror 252b and not implemented as part of the capture device 102*i*). Illuminating the dark areas 320*a*-320*b* from a high position may result in the shadows 602*a*-602*b* of some of the objects being projected. For example, the shadows 602*a*-602*b* may not be created if illumination comes from a position very close to the camera lenses 112*a*-112*n*. The processors 106*a*-106*n* may be configured to perform an analysis of the projected shadows 602*a*-602*b*. The analysis of the projected shadows 602*a*-602*b* may provide an additional source of data that may be used by the processors 106*a*-106*n*. For example, the shadows 602*a*-602*b* may facilitate the detection of the fire hydrant 560 and the tree 562. The projected shadows 602*a*-602*b* may improve detection when the capture devices 102*a*-102*n* are implemented as stereo camera pairs. The projected shadows 602*a*-602*n* may improve detection of objects when the capture devices 102*a*-102*n* are implemented as monocular cameras.

Generally, the capture device 102*g* and the capture device 102*i* may be located below the respective side view mirrors 252*a*-252*b*. The capture device 102*g* and the capture device 102*i* may not be located directly below the respective side view mirrors 252*a*-252*b*. For example, the capture device 102*g* and the capture device 102*i* may be located at a position slightly offset to the left or right and below the respective side view mirrors 252*a*-252*b*. Offsetting the location of the capture device 102*g* and the capture device 102*i* may enable the light 404*a*-404*n* projected from the illumination devices 402*a*-402*b* to have a slightly different angle than the field of view 314*a*-314*b* of the capture device 102*g* and/or the field of view 318*a*-318*b* of the capture device 102*i*. The slightly different angle may enable the shadows 602*a*-602*b* to be cast at an angle that may be visible within the respective fields of view of the capture device 102*g* and the capture device 102*i* (e.g., prevent the shadow 602*a* from being blocked from view by the fire hydrant 560 and prevent the shadow 602*b* from being blocked by the position of the tree 562).

The illumination devices 402*a*-402*b* may be located far enough above the capture devices 102*a*-102*n* to project the shadows 602*a*-602*b* of nearby objects. However, the light 404*a*-404*n* generated may not be directed upwards (e.g., towards the eyes of nearby people). The light 404*a*-404*n* may be configured to provide surrounding illumination around the ego vehicle 50 while the ego vehicle 50 perform a vehicle maneuver.

In the example shown, the processors 106*a*-106*n* may detect the curb 554, the vehicle 564, the tree 562 and the fire hydrant 560. The detection of the tree 562 may be irrelevant for performing a vehicle maneuver (e.g., the tree 562 may not interfere with autonomously performing parallel parking). The decision module 158 may determine that there may be sufficient space in front of the vehicle 564 in front of the curb 554 to perform the parallel parking maneuver. The CNN module 150 may detect the fire hydrant 560 with a high level of confidence. The high level of confidence may enable the decision module 158 to classify the object 560 as a fire hydrant. By detecting the fire hydrant 560, the decision module 158 may determine that the space in front of the curb 554 may not be available for performing the autonomous vehicle maneuver (e.g., determine that parking in front of the detected fire hydrant 560 may be illegal). For example, the processors 106*a*-106*n* may generate the signal VCTRL to cancel and/or interrupt the parallel parking maneuver. The ego vehicle 50 may instead continue driving on the road 552 while analyzing the video frames generated to determine when there may be a legal opening near the curb 554 to perform the parallel parking maneuver. While the example shown may describe a parallel parking maneuver, the type of autonomous vehicle maneuver analyzed by the processors 106*a*-106*n* may be varied according to the design criteria of a particular implementation.

Figure 13:
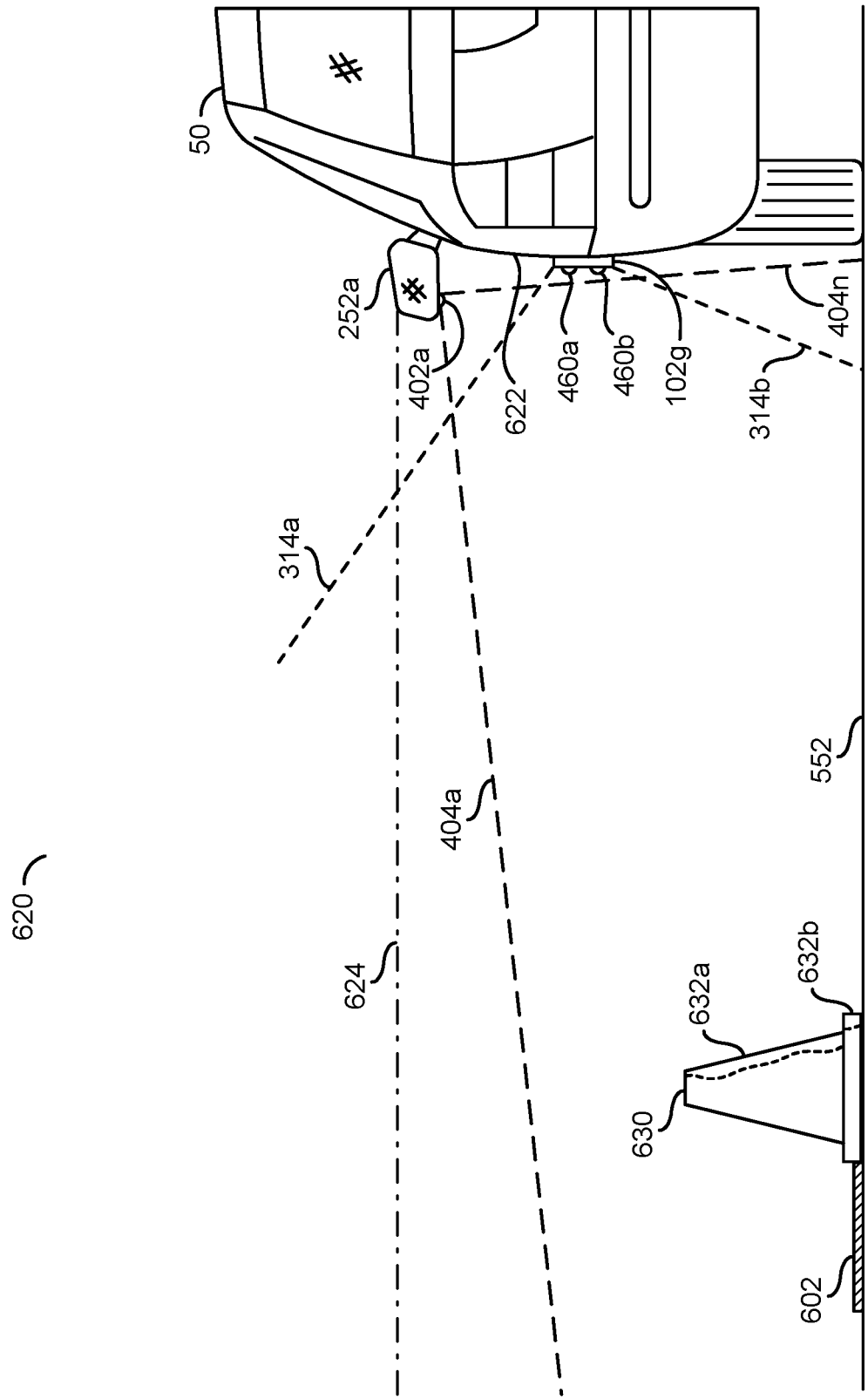
FIG. 13 is a diagram illustrating a range of illumination from a side view.

Referring to FIG. 13, a diagram illustrating a range of illumination from a side view is shown. A view 620 is shown. The view 620 may provide a view of a driver side of the ego vehicle 50 from the rear. A side 622 of the ego vehicle 50 is shown. The side 622 may comprise a side panel and/or a door of the ego vehicle 50. In the example shown, the side 622 may be the driver side of the ego vehicle 50. The side 622 of the ego vehicle 50 may comprise the side-view mirror 252*a* having the illumination device 402*a* and the capture device 102*g* having the stereo pair of cameras 460*a*-460*b*. While the view 620 corresponds to the driver side 622 of the ego vehicle 50, embodiments of the present invention may be similarly implemented on the passenger side of the ego vehicle 50 (e.g., with the side-view mirror 252*b*, the illumination device 402*b* and/or the capture device 102*i*). Generally, the side 622 of the ego vehicle 50 may be a surface of the ego vehicle 50 that is parallel to the direction of travel of the ego vehicle 50.

The side view 620 may comprise a two-dimensional representation of the field of view 314*a*-314*b* of the capture device 102*g*. The field of view 314*a*-314*b* may capture an area outwards from the driver side 622 of the ego vehicle 50. Similarly, the field of view 318*a*-318*b* may capture an area outwards from the passenger side of the ego vehicle 50. For example, the field of view 314*a*-314*b* may provide a field of view similar to what the driver 202 would see if looking out the window of the driver side door and provide additional information that the driver 202 would not be able to see (e.g., areas not visible because of the side panel 622 of the ego vehicle 50). In one example, the capture device 102*g* may implement a short range camera. The pixel data captured by the short range camera 102*g* may provide data that may be used by the processors 106*a*-106*n* to detect obstacles in a close proximity of the ego vehicle 50. For example, the field of view 314*a*-314*b* may capture an area between zero and five meters around the ego vehicle 50.

The light 404*a*-404*n* is shown being projected by the illumination device 402*a*. The light 404*a*-404*n* may be projected by the illumination device 402*a* outwards from the side 622 of the ego vehicle 50 (e.g., perpendicular to the direction of travel of the ego vehicle 50). The range of the light 404*a*-404*n* may be projected down towards the ground near the ego vehicle 50 (e.g., the area approximately zero feet from the ego vehicle 50). The range of the light 404*a*-404*n* may be projected outwards to illuminate the area to the side 622 of the ego vehicle 50. For example, the range of the light 404*a*-404*n* may be projected out to the side 622 of the ego vehicle 50 to illuminate at least the range of the field of view 314*a*-314*b* of the capture device 102*g*. The range of the light 404*a*-404*n* projected by the illumination device 402*b* on the passenger side of the ego vehicle 50 may be similar to the example shown.

A dotted line 624 is shown. The dotted line 624 may be level with a height of the side view mirror 252*a*. The range of the light 404*a*-404*n* is shown entirely below the level of the line 624. The light 404*a*-404*n* projected by the illumination devices 402*a*-402*b* may be below the level 624 of the side view mirrors 252*a*-252*b*. By keeping the light 404*a*-404*n* below the level 624 of the side view mirrors 252*a*-252*b*, the light 404*a*-404*n* may not be projected into the eyes of people near the ego vehicle 50. For example, keeping the 404*a*-404*n* below the level 624 of the side view mirrors 252a-252b, the light 404a-404n projected by the illumination devices 402a-402b may be in a direction that complies with regulations for vehicles.

A pylon 630 is shown beside the side 622 of the ego vehicle 50. The pylon 630 may be a representative example of an obstacle near the ego vehicle 50. For example, the pylon 630 may be in the way if the ego vehicle 50 were to perform a vehicle maneuver of parallel parking. The light 404a-404n generated by the illumination device 402a may be projected onto the obstacle 630. Projecting the light 404a-404n onto the obstacle 630 may create the shadow 602. For example, the shadow 602 may be a shadow cast by the pylon 630 resulting from the light 404a-404n.

Areas 632a-632b are shown on the pylon 630. The areas 632a-632b may represent areas illuminated by the light 404a-404n projected onto the pylon 630. For example, the illuminated areas 632a-632b are shown on a section of the pylon 630 facing the side 622 of the ego vehicle 50.

The light 404a-404n may be projected with a pattern. The illuminated areas 632a-632b may have the projected pattern. The pattern may enable the disparity engine 164 to determine a distance of the obstacle 630 from the side 622 of the ego vehicle 50. In the example shown, the illuminated area 632a may be on a conical portion of the pylon 630 and the illuminated area 632b may be on the flat base of the pylon 630. Since the area 632b may be slightly closer to the side 622 of the ego vehicle 50 than the area 632a, the pattern may appear differently on the area 632b compared to the area 632a. Similarly, since the area 632b may be partially flat (e.g., parallel to the line 624 projecting out from the side 622 of the ego vehicle 50) and the area 632a may be upright (e.g., perpendicular to the line 624 projecting out from the side 622 of the ego vehicle 50), the pattern may appear differently on the area 632b compared to the area 632a. The differences between the pattern on the areas 632a-632b may provide a source of data for the disparity engine 164 to determine the location, size, distance and/or orientation of the obstacle 630.

Figure 14:
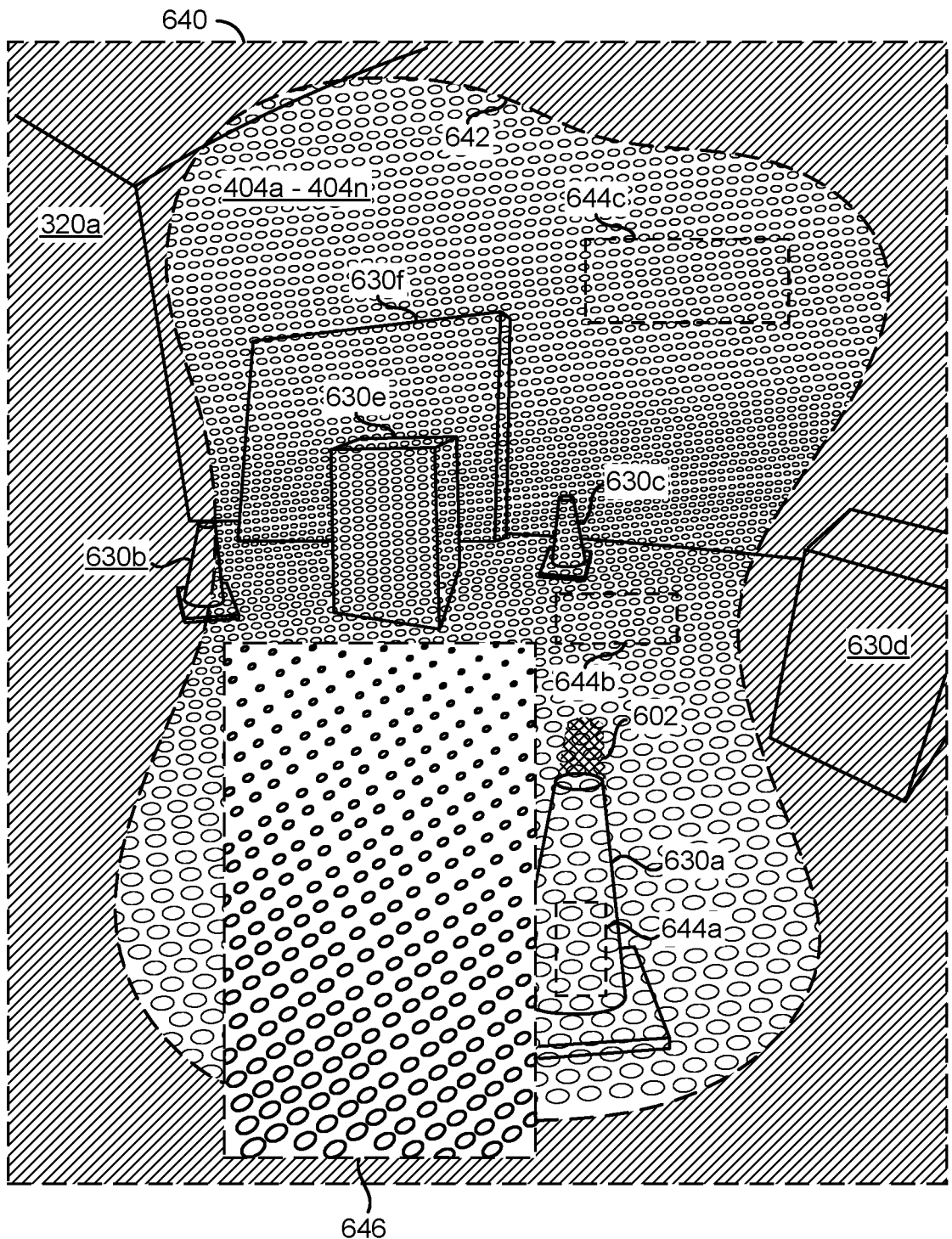
FIG. 14 is a diagram illustrating an example textured light pattern.

Referring to FIG. 14, a diagram illustrating an example textured light pattern is shown. An example video frame 640 is shown. The example video frame 640 may be one of the video frames generated in response to pixel data captured by the capture device 102g or the capture device 102i. For example, the video frame 640 may represent the field of view 318a-318b of the capture device 102i.

A dotted line 642 is shown. The dotted line 642 may separate the dark area 320a from the light 404a-404n. The video frame 640 may comprise an area that may be the dark area 320a and an area that may be illuminated by the light 404a-404n. In the example shown, the dark area 320a may be provided as an illustrative example. For example, in some embodiments, the light 404a-404n may cover the entire video frame 640 (e.g., the light 404a-404n may prevent all of the dark area 320a from being captured).

The area with the light 404a-404n may comprise a textured pattern. In the example shown, the textured pattern may be a dotted pattern. In one example, the pattern may be created as a result of the shape of the textured lens 424. In another example, the pattern may be created in response to the signal VCTRL from the processor 106a-106n (e.g., the light control device 454 may cause the light-emitting diode 452 to create a pattern in response to the signal VCTRL). The size of the dots of the pattern may be exaggerated for illustrative purposes. In one example, the dots may be small enough to be generally unnoticeable to the human eye. The type of pattern, the size of dots of the pattern and/or how the pattern is generated may be varied according to the design criteria of a particular implementation.

The example video frame 640 may comprise obstacles 630a-630f. The distance of the obstacles 630a-630f may be determined by how close the obstacle is to the foreground of the example video frame 640 (e.g., how far away the object is from the camera that captured the example video frame 640). In the example shown, the obstacle 630a may be a pylon in the light 404a-404n located a close distance to the camera, the obstacle 630b may be a pylon in the dark area 320b located a medium distance to the camera, the obstacle 630c may be a pylon in the light 404a-404n located a far distance to the camera, the obstacle 630d may be a box in the dark area 320a located a medium distance to the camera, the obstacle 630e may be a box in the light 404a-404n a medium distance to the camera and the obstacle 630f may be a box in the light 404a-404n a far distance to the camera. The shadow 602 is shown behind the pylon 630a. The obstacles 630b and 630d located in the dark area 320a may be harder for the processors 106a-106n to detect, determine a distance to, determine a location of, determine a shape/orientation of, to classify, etc. The obstacles 630a, 630c, 630e and 630f located in the light 404a-404n may each have the pattern projected onto them and the pattern may vary based on the distance from the illumination devices 402a-402b.

A dotted box 644a is shown on the obstacle 630a (e.g., at a close distance from the camera and/or the illumination devices 402a-402b). A dotted box 644b is shown a medium distance (e.g., near the box 630e) from the camera and/or the illumination devices 402a-402b. A dotted box 644c is shown at a far distance (e.g., near the box 630f) from the camera and/or the illumination devices 402a-402b. The dotted boxes 644a-644c may comprise a representative sample of the dots of the pattern at various distances from the camera and/or the illumination devices 402a-402b.

The dotted box 644a may comprise dots of the pattern having a large size. The disparity engine 164 may detect the large sized dots on the pylon 630a. The large sized dots on the pylon 630a may be one source of data that the processors 106a-106n may use to determine the size and/or location of the pylon 630a.

The dotted box 644b may comprise dots of the pattern having a medium size. The disparity engine 164 may detect the medium sized dots on the box 630e. The medium sized dots on the box 630e may be one source of data that the processors 106a-106n may use to determine the size and/or location of the box 630e.

The dotted box 644c may comprise dots of the pattern having a small size. The disparity engine 164 may detect the small sized dots on the box 630f and/or the pylon 630c. The small sized dots on the box 630f and/or the pylon 630c may be one source of data that the processors 106a-106n may use to determine the size and/or location of the box 630e and/or the pylon 630c.

The disparity engine 164 may be configured to compare the relative size of the shapes (e.g., dots) of the textured pattern in order to determine how far objects are from the ego vehicle 50. Objects illuminated with the light 404a-404n with larger shapes may be determined to be relatively closer to the ego vehicle 50 while objects illuminated with the light 404a-404n with smaller shapes may be determined to be relatively farther from the ego vehicle 50. The textured pattern may be further analyzed to determine an orientation of the detected objects. For example, surfaces that are parallel to the outward projection of light 404a-404n (e.g., the ground that extends away from the ego vehicle 50) may have a pattern with oblong shaped dots (e.g., the circular shape is stretched because the bottom of the dot may hit the ground closer and the top of the dot may hit the ground farther away). In another example, surfaces that are perpendicular to the outward projection of the light 404a-404n (e.g., the pylon 630a sitting upright) may have a pattern with circular shaped dots. The textured pattern of the light may be used by the processors 106a-106n to determine an orientation of the obstacles.

An area 646 is shown. The area 646 may be a representation of the textured pattern projected onto the ground in the example video frame 640. The textured pattern 646 may illustrate the textured pattern at various distances. The textured pattern 646 may be a structured light pattern. For example, the bottom of the textured pattern 646 may be closer to the ego vehicle 50 and the top of the textured pattern 646 may be farther away from the ego vehicle 50. The textured pattern 646 may appear larger at the bottom of the enlarged view. The textured pattern 646 may gradually become smaller farther away from the ego vehicle 50. The textured pattern 646 may aid stereo processing performed by the disparity engine 164. The textured pattern 646 may aid stereo processing by providing a reference that may be used to distinguish objects at various distances from the capture devices 102a-102n. For example, the illumination devices 402a-402n may facilitate the detection of objects by the processors 106a-106n by applying the pattern 646.

In some embodiments, the light 404a-404n may be light in the visible spectrum. In some embodiments, the light 404a-404n may be in the infrared spectrum. For example, the illumination devices 402a-402n may comprise an infrared light source. Embodiments implementing the infrared light source may also be configured to provide the textured pattern in the light 404a-404n. For example, the textured dome lens 424 may be configured to let infrared light shine through with a textured pattern. The type of the light 404a-404n may be varied according to the design criteria of a particular implementation.

Figure 15:
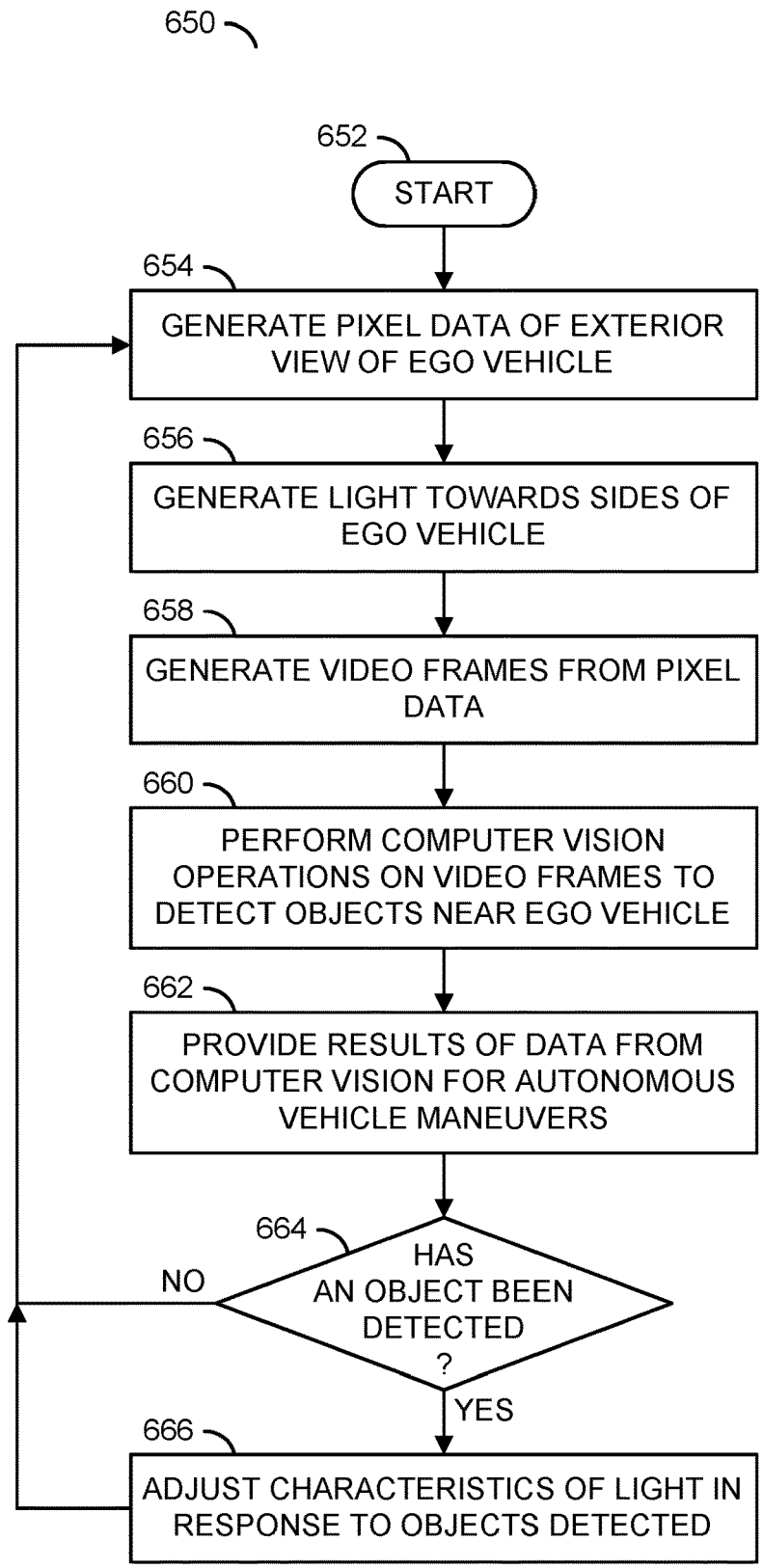
FIG. 15 is a flow diagram illustrating a method for adjusting characteristics of a light source in response to objects detected in an illuminated video frame.

Referring to FIG. 15, a method (or process) 650 is shown. The method 650 may adjust characteristics of a light source in response to objects detected in an illuminated video frame. The method 650 generally comprises a step (or state) 652, a step (or state) 654, a step (or state) 656, a step (or state) 658, a step (or state) 660, a step (or state) 662, a decision step (or state) 664, and a step (or state) 666.

The step 652 may start the method 650. In the step 654, the capture devices 102a-102n may capture pixel data in response to the light input IM_A-IM_N received by the lenses 112a-112n. The pixel data may correspond to an area external to the ego vehicle 50. Next, in the step 656, illumination devices 402a-402b may generate and/or project the light 404a-404n towards the sides of the ego vehicle 50. In the step 658, the processors 106a-106n may generate the video frames (e.g., the example video frame 600 shown in association with FIG. 12) from the pixel data. In an example, the video processing pipeline 156 may receive the pixel data FRAMES_A-FRAMES_N and convert the pixel data into video frames. In another example, the capture devices 102a-102n may be configured to generate video frames and communicate the video frames FRAMES_A-FRAMES_N to the processors 106a-106n. The video frames generated may be illuminated as a result of the light 404a-404n projected by the illumination devices 402a-402b. Next, the method 650 may move to the step 660.

In the step 660, the CNN module 150 may perform the computer vision operations on the video frames. The computer vision operations may be performed according to the configuration of the dedicated hardware modules 180a-180n. The computer vision operations may detect objects and/or obstacles near the ego vehicle 50. Next, in the step 662, the CNN module 150 may provide the results of the computer vision operations for autonomous vehicle maneuvers. In one example, the results of the computer vision operations may be analyzed by the processors 106a-106n and the decision module 158 may determine which vehicle maneuvers to perform based on the analysis of the results of the computer vision operations. In some embodiments, the results (e.g., the signal DATA) may be provided to the interface 104 and the interface 104 may provide the results to another system of the ego vehicle 50 that controls autonomous movement. Next, the method 650 may move to the decision step 664.

In the decision step 664, the processors 106a-106n may determine whether an object has been detected. For example, the CNN module 150 may be configured to detect objects, determine characteristics of the detected objects, determine a location and/or orientation of objects near the ego vehicle 50. If an object has not been detected, then the method 650 may return to the step 654. If an object has been detected, then the method 650 may move to the step 666. In the step 666, the processors 106a-106n may be configured to generate the signal VCTRL to adjust the characteristics of the light 404a-404n in response to the objects (or the characteristics of the objects) detected. In an example, the signal VCTRL may be provided to the light controller 454 and the light controller 454 may adjust the light-emitting diode 452. For example, the processors 106a-106n may select a color, a frequency (e.g., a strobing effect), an intensity for the light 404a-404n in response to the objects detected. Next, the method 650 may return to the step 654.

Figure 16:
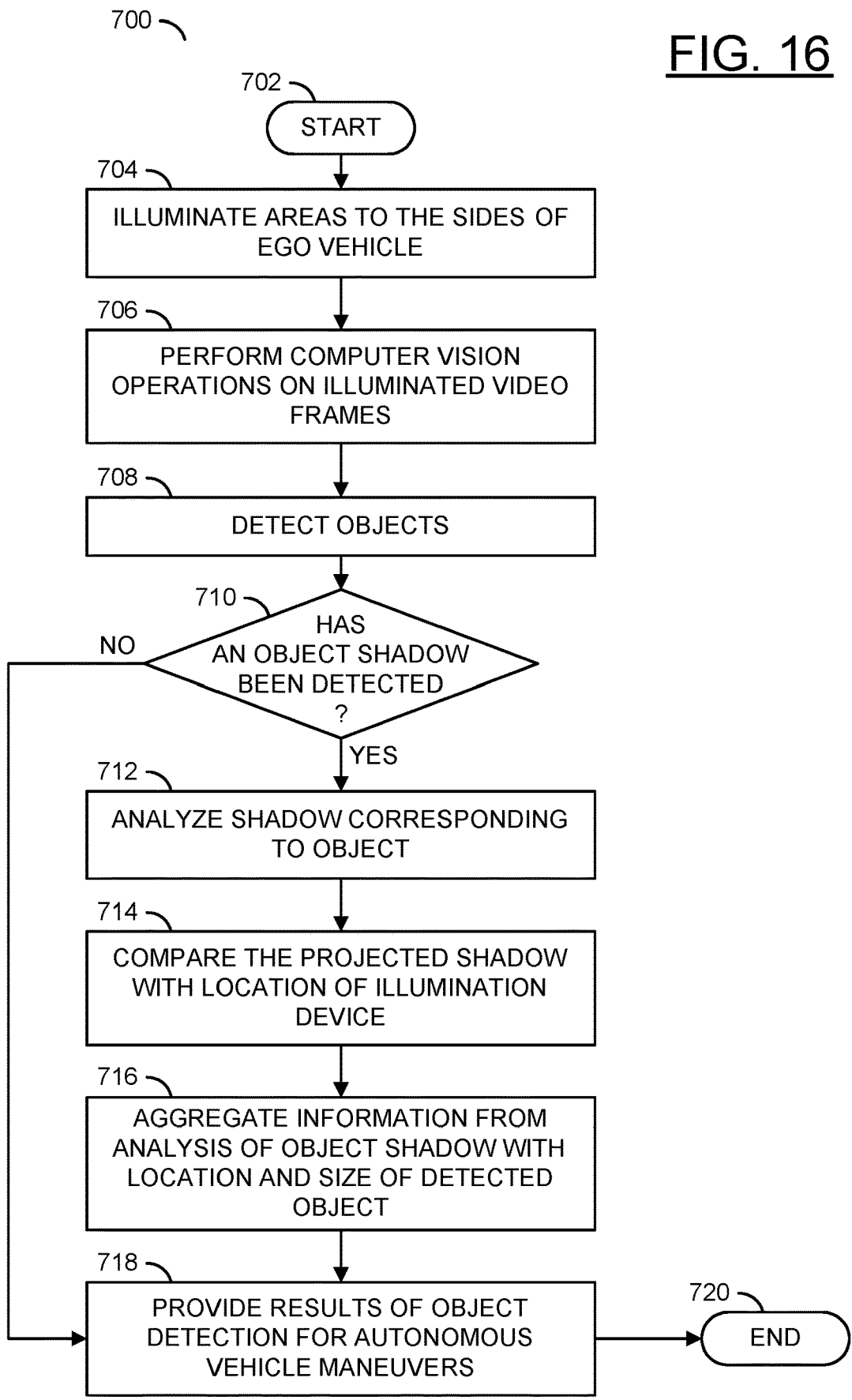
FIG. 16 is a flow diagram illustrating a method for analyzing a shadow cast in response to a projected light to determine a location of an object.

Referring to FIG. 16, a method (or process) 700 is shown. The method 700 may analyze a shadow cast in response to a projected light to determine a location of an object. The method 700 generally comprises a step (or state) 702, a step (or state) 704, a step (or state) 706, a step (or state) 708, a decision step (or state) 710, a step (or state) 712, a step (or state) 714, a step (or state) 716, a step (or state) 718, and a step (or state) 720.

The step 702 may start the method 700. In the step 704, the illumination devices 402a-402n may generate the light 404a-404n to illuminate the areas near the sides (e.g., the passenger side and the driver side) of the ego vehicle 50. In the step 706, the processors 106a-106n may perform the computer vision operations in the illuminated video frames. Next, in the step 708, the CNN module 150 may detect, classify and/or analyze objects in the illuminated video frames. Next, the method 700 may move to the decision step 710.

In the decision step 710, the CNN module 150 may determine whether an object shadow has been detected. For example, the projected light 404a-404n may cause the objects near the ego vehicle 50 to cast the shadows 602a-602n. The CNN module 150 may be configured to detect the shadows 602a-602n and/or associate the shadows 602a-602n with the objects that are casting the shadows 602a-602n. If the shadows 602a-602n have not been detected, then the method 700 may move to the step 718. If the shadows 602a-602n have been detected, then the method 700 may move to the step 712.

In the step 712, the processors 106a-106n may analyze the shadows 602a-602n corresponding to the objects casting the shadows 602a-602n. Next, in the step 714, the processors 106a-106n may compare the projected shadows 602a-602n with the location of the illumination devices 402a-402b. The comparison may be configured to determine an angle of the light 404a-404n projected and/or a distance to the illumination devices 402a-402b. In the step 716, the processors 106a-106n may aggregate the information determined in response to the analysis of the shadows 602a-602n with the location and/or size of the detected objects. Next, the method 700 may move to the step 718.

In the step 718, the processors 106a-106n may provide the results of the object detection (which may comprise the aggregated information determined from the shadows 602a-602n) for autonomous movements of the ego vehicle 50. Next, the method 700 may move to the step 720. The step 720 may end the method 700.

Figure 17:
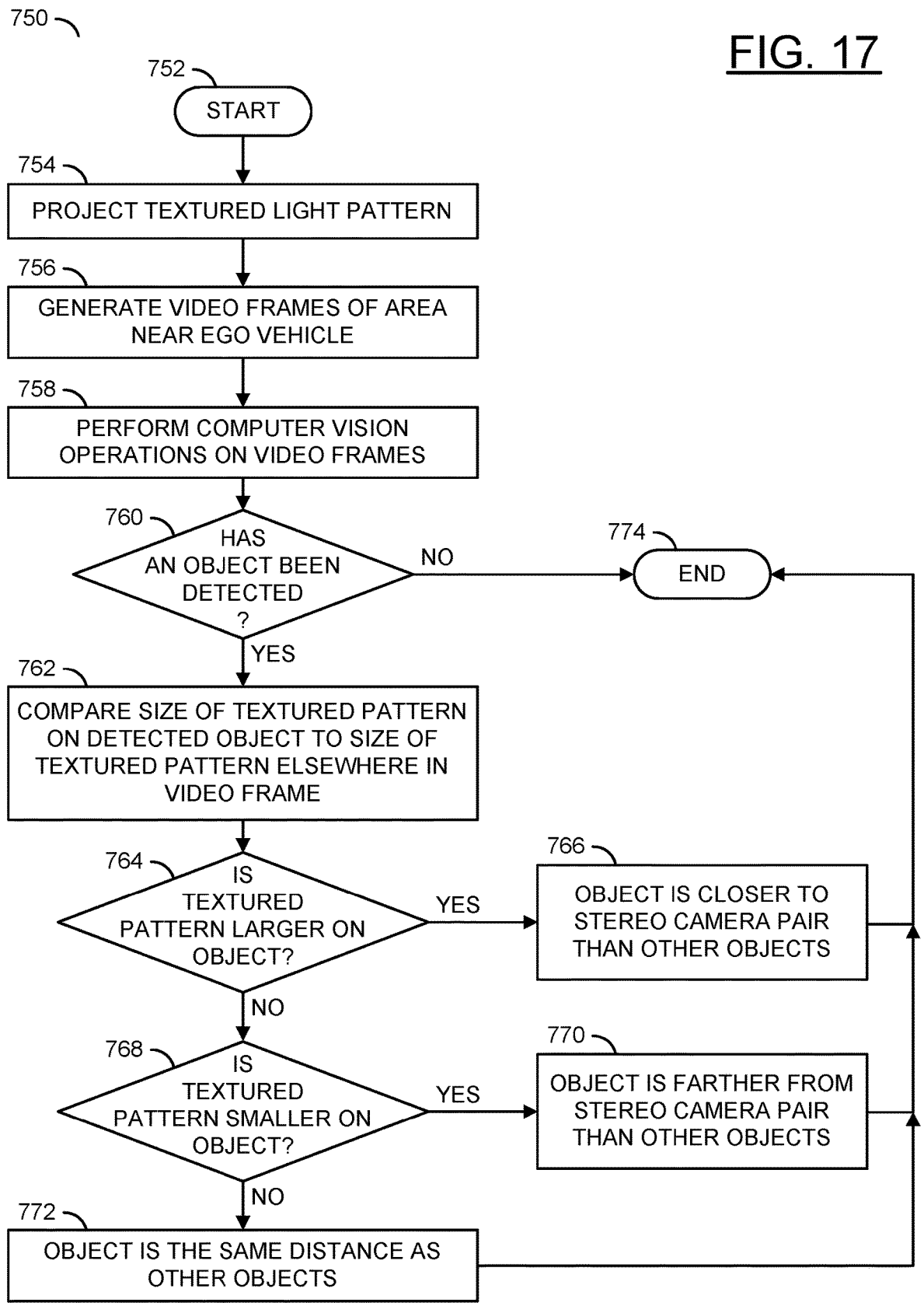
FIG. 17 is a flow diagram illustrating a method for analyzing a textured pattern of light projected onto objects.

Referring to FIG. 17, a method (or process) 750 is shown. The method 750 may analyze a textured pattern of light projected onto objects. The method 750 generally comprises a step (or state) 752, a step (or state) 754, a step (or state) 756, a step (or state) 758, a decision step (or state) 760, a step (or state) 762, a decision step (or state) 764, a step (or state) 766, a decision step (or state) 768, a step (or state) 770, a step (or state) 772, and a step (or state) 774.

The step 752 may start the method 750. In the step 754, the illumination devices 402a-402n may generate the textured pattern 646. In the step 756, the processors 106a-106n may generate illuminated video frames of the area near the sides of ego vehicle 50. Next, in the step 758, the processors 106a-106n may perform the computer vision operations on the illuminated video frames. Next, the method 750 may move to the decision step 760.

In the decision step 760, the processors 106a-106n may determine whether an object has been detected in the illuminated video frames. If no object has been detected, then the method 750 may move to the step 774. If at least one object has been detected in the illuminated video frames, then the method 750 may move to the step 762. In the step 762, the disparity engine 164 may compare the size of the textured pattern 646 on the detected object to the size of the textured pattern 646 elsewhere in the video frame. Next, the method 750 may move to the decision step 764.

In the decision step 764, the disparity engine 164 may determine whether the textured pattern 646 has a larger pattern size on the detected object. For example, the disparity engine 164 may compare the size of the textured pattern 646 at all locations of the video frame 650. The disparity engine may determine the relative size of the textured pattern 646 on various objects and/or surfaces (e.g., walls, the ground, a ceiling, etc.). If the textured pattern 646 is relatively larger than on other locations of the video frame 650, then the method 750 may move to the step 766. In the step 766, the processors 106a-106n may determine that the detected object having the larger textured pattern 646 may be closer to the stereo pair of cameras than other objects in the example video frame 650. Next, the method 750 may move to the step 774. In the decision step 764, if the textured pattern 646 is not relatively larger, then the method 750 may move to the decision step 768.

In the decision step 768, the disparity engine 164 may determine whether the textured pattern 646 has a smaller pattern size on the detected object. If the textured pattern 646 is relatively smaller than on other locations of the video frame 650, then the method 750 may move to the step 770. In the step 770, the processors 106a-106n may determine that the detected object having the smaller textured pattern 646 may be farther from the stereo pair of cameras than other objects in the example video frame 650. Next, the method 750 may move to the step 774. In the decision step 768, if the textured pattern 646 is not relatively smaller, then the method 750 may move to the step 772.

In the step 772, the processors 106a-106n may determine that the detected object may be generally the same distance as other objects in the video frame 650. Next, the method 750 may move to the step 774. The step 774 may end the method 750. While the method 750 may generally describe the comparison of the texture size of the textured pattern 646 as discrete steps (e.g., a large pattern in the decision step 764 and a small pattern in the decision step 768), the comparisons of the size of the textured pattern 646 made by the disparity engine 164 may comprise any number of size comparisons.

Figure 18:
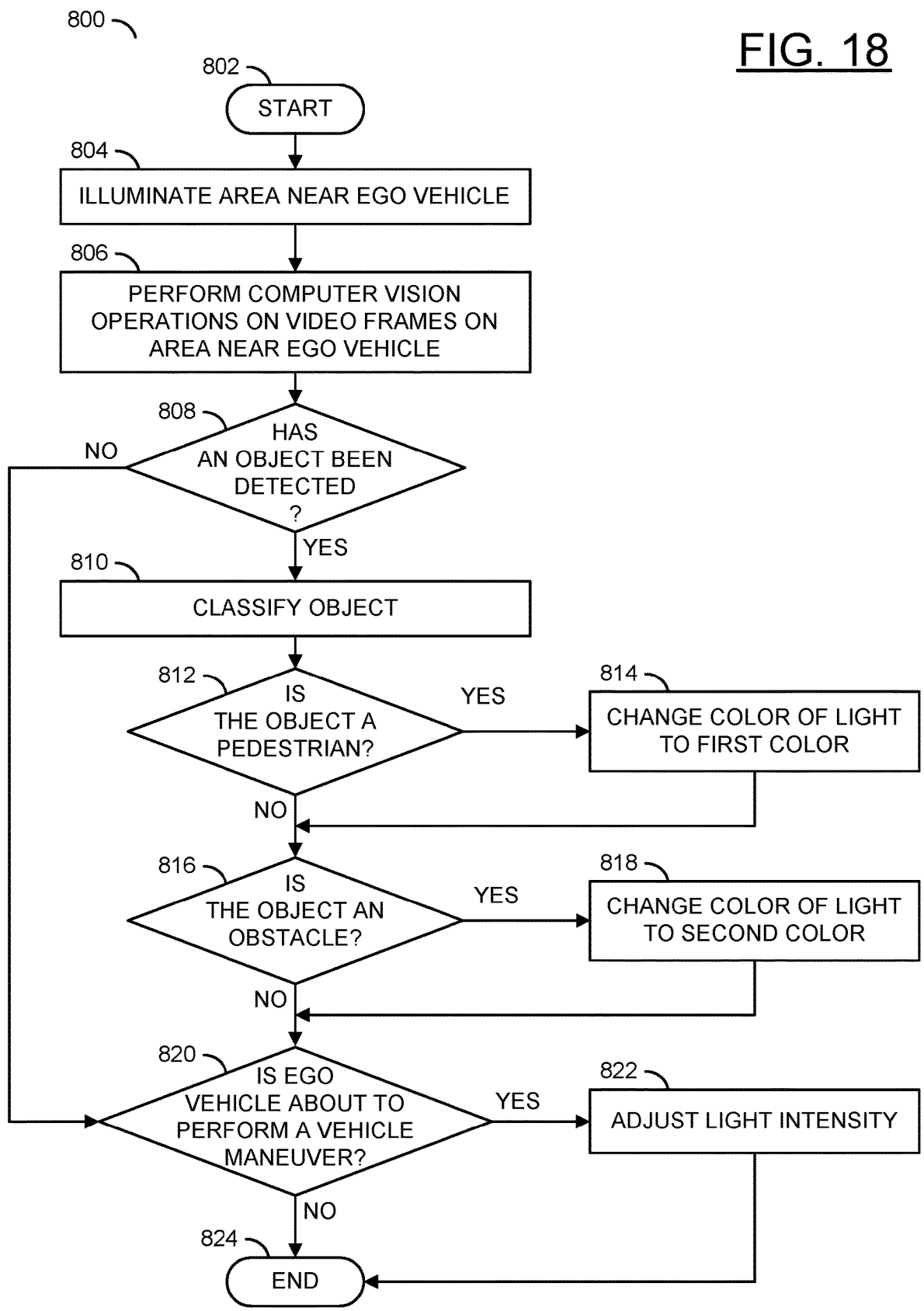
FIG. 18 is a flow diagram illustrating a method for adjusting characteristics of a light source in response to an autonomous vehicle maneuver.

Referring to FIG. 18, a method (or process) 800 is shown. The method 800 may adjust characteristics of a light source in response to an autonomous vehicle maneuver. The method 800 generally comprises a step (or state) 802, a step (or state) 804, a step (or state) 806, a decision step (or state) 808, a step (or state) 810, a decision step (or state) 812, a step (or state) 814, a decision step (or state) 816, a step (or state) 818, a decision step (or state) 820, a step (or state) 822, and a step (or state) 824.

The step 802 may start the method 800. In the step 804, the illumination devices 402a-402b may illuminate the area near the ego vehicle 50. Next, in the step 806, the processors 106a-106n may perform the computer visions operations on the illuminated video frames of the area near the ego vehicle 50. Next, the method 800 may move to the decision step 808.

In the decision step 808, the processors 106a-106n may determine whether an object has been detected in the video frame. If an object has not been detected, then the method 800 may move to the decision step 820. If an object has been detected, then the method 800 may move to the step 810. In the step 810, the CNN module 150 may classify the object. For example, classifying the object may identify the detected object as a particular type/class of object (e.g., a pedestrian, an animal, a streetlight, a street sign, a building, an emergency vehicle, a moving vehicle, a parked vehicle, etc.). The number of classes for objects may be varied according to the design criteria of a particular implementation. Next, the method 800 may move to the decision step 812.

In the decision step 812, the processors 106a-106n may determine whether the detected object has been classified as a pedestrian. If the object is a pedestrian, then the method 800 may move to the step 814. In the step 814, the processors 106a-106n may generate the signal VCTRL and present the signal VCTRL to the light control circuit 454 to cause the light 404a-404n to change to a first color. For example, the light 404a-404n may be changed to a yellow color in response to detecting a pedestrian. Next, the method 800 may move to the decision step 816.

In the decision step 816, the processors 106a-106n may determine whether the detected object has been classified as an obstacle. In an example, an obstacle may be an animate object (e.g., a person, an animal, etc.) and/or an inanimate object (e.g., a curb, a pylon, a fire hydrant, etc.). If the object is an obstacle, then the method 800 may move to the step 818. In the step 818, the processors 106a-106n may generate the signal VCTRL and present the signal VCTRL to the light control circuit 454 to cause the light 404a-404n to change to a second color (e.g., a color different than the first color). For example, the light 404a-404n may be changed to a red color in response to detecting an obstacle. Next, the method 800 may move to the decision step 820.

While two example adjustments to the characteristics of the light 404a-404n generated are described in the steps 812-818, the processors 106a-106n may select different colors for other types of objects, different colors in response to detecting a pedestrian and/or an obstacle, and/or select a different characteristic of the light 404a-404n to adjust. In an example, when a pedestrian is detected, the frequency of the light 404a-404n may be adjusted to generate a strobe effect. In another example, when a pedestrian is detected, the intensity of the light 404a-404n may be increased (or decreased). In yet another example, the light 404a-404n may be dimmed (e.g., adjusted to a dim amount of lighting) when the object detected is not an obstacle. In still another example, the light 404a-404n may be increased (e.g., adjusted to a bright amount of lighting) when the object detected is an obstacle. The type of adjustment to the characteristics to the light 404a-404n in response to the particular class of object detected may be varied according to the design criteria of a particular implementation.

In the decision step 820, the processors 106a-106n may determine whether the ego vehicle 50 is about to perform a vehicle maneuver. In one example, if the processors 106a-106n are configured to perform the vehicle maneuver (e.g., autonomously control the ego vehicle 50 in response to the computer vision analysis performed), then the processors 106a-106n may know in advance about the type of vehicle maneuver that may be performed. In another example, if another system of the ego vehicle 50 performs the autonomous movement of the ego vehicle 50, then the processors 106a-106n may read an output from the system that controls the autonomous movement of the ego vehicle 50 to determine which autonomous movement may be performed next. If the ego vehicle 50 is not about to perform a vehicle maneuver, then the method 800 may move to the step 824. If the ego vehicle 50 is about to perform a vehicle maneuver, then the method 800 may move to the step 822.

In the step 822, the processors 106a-106n may generate the signal VCTRL and present the signal VCTRL to the light control circuit 454 to adjust an intensity of the light 404a-404n. Next, the method 800 may move to the step 824. The step 824 may end the method 800.

While an adjustment to the intensity of the light 404a-404n is described in the step 822, the processors 106a-106n may perform other adjustments to the characteristics of the light 404a-404n in response to vehicle maneuvers. In one example, the processors 106a-106n may select a frequency change for the light 404a-404n to indicate that the ego vehicle 50 may pull out of a parking spot (e.g., to provide a strobe effect as a warning to people nearby that the ego vehicle 50 may suddenly start moving). In another example, each type of vehicle maneuver may be assigned a particular color (e.g., the light 404a-404n may be changed to a green color when the ego vehicle 50 is about to start moving, changed to red to indicate a right turn, changed to blue to indicate a left turn, changed to yellow when performing a parking maneuver, etc.). The types of changes to the characteristics of the light 404a-404n for each of the various types of vehicle maneuvers may be varied according to the design criteria of a particular implementation.

The functions performed by the diagrams of FIGS. 1-18 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
a capture device configured to generate pixel data corresponding to an exterior side view from a vehicle;
an illumination device attached to a side view mirror configured to generate a textured light pattern for said exterior side view; and
a processor configured to (i) process said pixel data arranged as video frames, (ii) perform computer vision operations on said video frames to detect objects in said video frames and (iii) generate a control signal, wherein
 (a) said objects and said textured light pattern detected provide data to enable autonomous control of said vehicle for an autonomous vehicle maneuver performed in response to said objects detected using said computer vision operations,
 (b) said control signal adjusts characteristics of said textured light pattern in response to said objects detected by said processor,
 (c) said textured light pattern facilitates detection using said computer vision operations of said objects located in said exterior side view from said vehicle, and
 (d) said capture device is mounted (i) on a side body of said vehicle separate from said side view mirror and (ii) at a level below said illumination device.

2. The apparatus according to claim 1, wherein said autonomous vehicle maneuver is a low-speed maneuver.

3. The apparatus according to claim 2, wherein said low-speed maneuver comprises pulling into or pulling out of a parking space.

4. The apparatus according to claim 1, wherein said autonomous vehicle maneuver comprises changing lanes.

5. The apparatus according to claim 1, wherein said computer vision operations comprise analyzing changes to individual shapes of said textured light pattern to facilitate said detection of said objects located in said exterior side view from said vehicle.

6. The apparatus according to claim 5, wherein said changes to said individual shapes of said textured light pattern comprise round shaped dots projecting as oblong shaped dots on surfaces not perpendicular to said projection of said textured light pattern.

7. The apparatus according to claim 1, wherein (i) said textured light pattern is projected towards surfaces to a side of said vehicle and (ii) across a field of view of said capture device.

8. The apparatus according to claim 1, said exterior side view from said vehicle comprises a field of view directed outwards from a driver side of said vehicle.

9. The apparatus according to claim 1, said exterior side view from said vehicle comprises a field of view directed outwards from a passenger side of said vehicle.

10. The apparatus according to claim 1, wherein said textured light pattern generated by said illumination device is in a visible spectrum.

11. The apparatus according to claim 1, wherein said textured light pattern generated by said illumination device is in an infrared spectrum.

12. The apparatus according to claim 1, wherein said objects detected enable said vehicle to avoid said objects while performing said autonomous vehicle maneuver.

13. The apparatus according to claim 1, wherein said textured light pattern is generated in a direction that complies with regulations regarding illumination devices for vehicles.

14. The apparatus according to claim 1, wherein (i) said capture device comprises a stereo camera, (ii) said textured light pattern aids stereo processing performed by said processor in response to pairs of said pixel data captured by said stereo camera and (iii) said stereo processing performed by said processor is used to determine a distance of said stereo camera from said objects.

15. The apparatus according to claim 1, wherein individual shapes of said textured light pattern are configurable by said processor.

16. The apparatus according to claim 1, wherein (i) said characteristics of said textured light pattern comprise an amount of light and (ii) said processor adjusts said textured light pattern to (a) a dim amount of said light when said objects detected do not comprise an obstacle and (b) a bright amount of said light when said objects detected comprise an obstacle.

17. The apparatus according to claim 1, wherein (i) said characteristics of said textured light pattern comprise a color of said light and (ii) said processor adjusts said color in response to (a) said objects detected and (b) said autonomous vehicle maneuver performed by said vehicle.

18. The apparatus according to claim 1, wherein (i) said capture device is offset (a) to a right side or (b) to a left side of said illumination device, (ii) said offset enables said capture device to capture shadows cast by said objects in response to said textured light pattern and (iii) said processor is further configured to (a) detect said shadows, (b) analyze said shadows to determine a location of each of said objects compared to said illumination device, and (c) aggregate information from said analysis of said shadows with said location and a size of said detected objects.

19. A method for providing a light source for a vehicle camera, comprising the steps of:
generating pixel data corresponding to an exterior side view from a vehicle using a capture device;
generating a textured light pattern for said exterior side view using an illumination device attached to a side view mirror; and
processing said pixel data arranged as video frames;
performing computer vision operations on said video frames to detect objects in said video frames; and
generating a control signal, wherein
 (a) said objects and said textured light pattern detected provide data to enable autonomous control of said vehicle for a vehicle maneuver performed in response to said objects detected using said computer vision operations, (b) said control signal adjusts characteristics of said textured light pattern in response to a processor detecting said objects using said computer vision operations, (c) said textured light pattern facilitates detection using said computer vision operations of said objects located in said exterior side view from said vehicle, and (d) said capture device is mounted (i) on a side body of said vehicle separate from said side view mirror and (ii) at a level below said illumination device.

20. A method for providing a light source for a vehicle camera, comprising the steps of:

generating pixel data corresponding to an exterior view from a vehicle using a camera;

generating light for said exterior view;

processing said pixel data arranged as video frames;

performing computer vision operations on said video frames to detect objects in said video frames; and generating a control signal, wherein (a) said objects and said light detected provide data for data to enable autonomous control of said vehicle to perform a low-speed maneuver of said vehicle, (b) said control signal adjusts characteristics of said light generated by an illumination device, (c) said characteristics of said light comprise a textured pattern of said light, (d) said characteristics of said light are adjusted in response to said objects detected by a processor that performs said computer vision operations, and (e) said computer vision operations comprise analyzing changes to individual shapes of said textured pattern of said light to facilitate a detection of said objects during said low-speed maneuver.

* * * * *